United States Patent
Xu et al.

(10) Patent No.: US 10,755,063 B2
(45) Date of Patent: Aug. 25, 2020

(54) METHOD AND APPARATUS FOR DETECTING TWO-DIMENSIONAL BARCODE

(71) Applicant: TENCENT TECHNOLOGY (SHENZHEN) COMPANY LIMITED, Shenzhen, Guangdong (CN)

(72) Inventors: Dian Ping Xu, Shenzhen (CN); Yu Geng Lin, Shenzhen (CN); Chen Ran, Shenzhen (CN); Hong Yang Wang, Shenzhen (CN); Zhang Jing Yang, Shenzhen (CN); Jun Jie Zhou, Shenzhen (CN); Pin Lin Chen, Shenzhen (CN); Jing Wu, Shenzhen (CN); Han Qi Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/362,871

(22) Filed: Mar. 25, 2019

(65) Prior Publication Data

US 2019/0220640 A1 Jul. 18, 2019

Related U.S. Application Data

(63) Continuation of application No. PCT/CN2017/117194, filed on Dec. 19, 2017.

(30) Foreign Application Priority Data

Dec. 21, 2016 (CN) .......................... 2016 1 1192872

(51) Int. Cl.
*G06K 7/14* (2006.01)
*G06K 19/06* (2006.01)

(52) U.S. Cl.
CPC ......... *G06K 7/1417* (2013.01); *G06K 7/1439* (2013.01); *G06K 7/1447* (2013.01);
(Continued)

(58) Field of Classification Search
CPC ..... G06K 7/14; G06K 7/1413; G06K 7/10693
(Continued)

(56) References Cited

U.S. PATENT DOCUMENTS

2006/0091215 A1* 5/2006 Uchiyama ........ G06K 19/06037
235/462.1
2010/0155464 A1* 6/2010 Swayn ..................... G06K 7/14
235/375
(Continued)

FOREIGN PATENT DOCUMENTS

CN 102663784 A 9/2012
CN 103871027 A 6/2014
(Continued)

OTHER PUBLICATIONS

China Office Action for Application No. 201611192872.8 dated Jan. 11, 2019.
(Continued)

*Primary Examiner* — Edwyn Labaze
(74) *Attorney, Agent, or Firm* — Sughrue Mion, PLLC

(57) ABSTRACT

A method for detecting a two-dimensional barcode is provided. Binarization processing is performed on an image to obtain a binary image. Whether the binary image has a target pattern is determined, and it is determined that the binary image has a two-dimensional barcode in response to determining that the binary image has the target pattern. An enlarged image of the two-dimensional barcode is obtained, and two-dimensional barcode detection is performed on the enlarged image of the two-dimensional barcode.

19 Claims, 17 Drawing Sheets

(52) U.S. Cl.
CPC ..... *G06K 7/1473* (2013.01); *G06K 19/06037* (2013.01); *G06K 19/06046* (2013.01)

(58) Field of Classification Search
USPC .......... 235/462.01, 462.11, 462.14, 375, 454
See application file for complete search history.

(56) References Cited

U.S. PATENT DOCUMENTS

| | | | |
|---|---|---|---|
| 2014/0231501 A1* | 8/2014 | Mykhailenko | G06K 7/1443 235/375 |
| 2017/0185880 A1* | 6/2017 | Lin | G06T 11/001 |
| 2019/0102588 A1* | 4/2019 | Lin | G06K 19/06037 |
| 2019/0102590 A1* | 4/2019 | Musiani | G06K 7/1434 |

FOREIGN PATENT DOCUMENTS

| | | |
|---|---|---|
| CN | 104703020 A | 6/2015 |
| CN | 106127751 A | 11/2016 |
| CN | 106778440 A | 5/2017 |

OTHER PUBLICATIONS

International Search Report for PCT/CN2017/117194 dated Feb. 27, 2018 [PCT/ISA/210].

* cited by examiner

METHOD AND APPARATUS FOR DETECTING TWO-DIMENSIONAL BARCODE

CROSS-REFERENCE TO RELATED APPLICATION(S)

This application is a continuation of International Application No. PCT/CN2017/117194, filed on Dec. 19, 2017, in the Chinese Patent Office, which claims priority to Chinese Patent Application No. 201611192872.8, entitled "TWO-DIMENSIONAL BARCODE RECOGNITION METHOD AND APPARATUS" filed with on Dec. 21, 2016, the disclosures of which are incorporated by reference in their entireties.

BACKGROUND

1. Field

Exemplary embodiments of the disclosure relate to the field of image detection, and in particular, to a method and an apparatus for detecting a two-dimensional barcode.

2. Description of the Related Art

Two-dimensional barcodes are barcodes in which information is recorded by using patterns distributed in two-dimensional directions of a plane based on a particular rule. Two-dimensional barcodes are widely applied to fields such as payment, network links, and advertisement pushing because of many advantages such as large information capacities, low costs, and strong fault tolerant capabilities.

The related art provides a two-dimensional barcode detection method. In the method, a terminal enters a two-dimensional barcode detection mode. Then, the terminal performs two-dimensional barcode detection on an obtained image. When the detection succeeds, the terminal may obtain information recorded in a two-dimensional barcode. When the detection fails, it indicates that the image may have no two-dimensional barcode, and the terminal may stop detecting the two-dimensional barcode or control a camera to continue to obtain an image.

The related art has at least the following problems. When a terminal is far from a two-dimensional barcode, the two-dimensional barcode in an image obtained by the terminal is excessively small, and it may be difficult for the terminal to detect the two-dimensional barcode. Therefore, it is difficult to obtain information in the two-dimensional barcode.

SUMMARY

One or more exemplary embodiments provide a method and an apparatus for detecting a two-dimensional barcode, which solves the related-art problem that when a terminal is far from a two-dimensional barcode, it is difficult to obtain information in the two-dimensional barcode.

According to an aspect of an exemplary embodiment, a method for detecting a two-dimensional barcode is provided. Binarization processing is performed on an image to obtain a binary image. Whether the binary image has a target pattern is determined, and it is determined that the binary image has a two-dimensional barcode in response to determining that the binary image has the target pattern. An enlarged image of the two-dimensional barcode is obtained, and two-dimensional barcode detection is performed on the enlarged image of the two-dimensional barcode.

According to an aspect of another exemplary embodiment, an apparatus for detecting a two-dimensional barcode is provided. The apparatus includes at least one memory operable to store program code; and at least one processor operable to read the program code and operate as instructed by the program code. The program code includes binarization code configured to cause the at least one processor to perform binarization processing on an image to obtain a binary image; first determination code configured to cause the at least one processor to determine whether the binary image has a target pattern; second determination code configured to cause the at least one processor to determine that the binary image has a two-dimensional barcode in response to determining that the binary image has the target pattern; enlarging code configured to cause the at least one processor to obtain an enlarged image of the two-dimensional barcode; and detection code configured to cause the at least one processor to perform two-dimensional barcode detection on the enlarged image of the two-dimensional barcode.

According to an aspect of still another exemplary embodiment, a computer program product including an instruction is provided. When the computer program product runs on a terminal, the terminal is caused to perform the two-dimensional barcode detection method provided above.

According to an aspect of still another exemplary embodiment, a computer readable storage medium is provided. The computer readable storage medium stores an instruction, and when the computer readable storage medium runs on a processor of a terminal, the terminal is caused to perform the two-dimensional barcode detection method provided above.

The technical solutions provided in the embodiments of the disclosure have the following beneficial effects:

It is determined whether the binary image of an image has the target pattern, and when the target pattern exists, it is determined that the binary image has the two-dimensional barcode, and two-dimensional barcode detection is performed on the enlarged image of the two-dimensional barcode. This solves the related-art problem that when a terminal is far from a two-dimensional barcode, it is difficult to obtain information in the two-dimensional barcode. When the terminal is far from the two-dimensional barcode, the two-dimensional barcode can also be detected.

BRIEF DESCRIPTION OF THE DRAWINGS

The above and/or other aspects will become apparent and more readily appreciated by describing certain exemplary embodiments with reference to the accompanying drawings, in which:

FIG. 2-1 is a flowchart of another two-dimensional barcode detection method according to an embodiment;

FIG. 2-2 is a schematic diagram of obtaining an image on a two-dimensional barcode scanning interface by a terminal in the embodiment shown in FIG. 2-1;

FIG. 2-3 is a schematic diagram of a binary image in the embodiment shown in FIG. 2-1;

FIG. 2-4 is a schematic structural diagram of a quick response (QR) code in the embodiment shown in FIG. 2-1;

FIG. 2-5 is a schematic diagram of a position detection pattern, an amendment pattern, and a time pattern in the embodiment shown in FIG. 2-1;

FIG. 2-6 is a schematic diagram of a triangle found based on a binary image in the embodiment shown in FIG. 2-1;

FIG. 2-7 is a schematic diagram of displaying an enlarged image of a two-dimensional barcode in the embodiment shown in FIG. 2-1;

FIG. 2-8 is a flowchart of determining whether a binary image has a target pattern in the embodiment shown in FIG. 2-1;

FIG. 2-9 shows an image obtained after performing expansion processing on a binary image in the embodiment shown in FIG. 2-1;

FIG. 2-10 shows an image obtained after performing corrosion processing on a binary image in the embodiment shown in FIG. 2-1;

FIG. 2-11 shows an image obtained after performing exclusive OR processing in the embodiment shown in FIG. 2-1;

FIG. 2-12 is a schematic diagram of determining a target rectangle surrounding a first pattern in the embodiment shown in FIG. 2-1;

FIG. 2-13 is a schematic diagram of determining a scanning line surrounding a first pattern in the embodiment shown in FIG. 2-1;

FIG. 2-14 is another flowchart of determining whether a binary image has a target pattern in the embodiment shown in FIG. 2-1;

FIG. 2-15 is a schematic diagram of a preset range of a binary image in the embodiment shown in FIG. 2-1;

FIG. 3-1 is a block diagram of a two-dimensional barcode detection apparatus according to an embodiment;

FIG. 3-2 is a block diagram of a judging module in the embodiment shown in FIG. 3-1;

FIG. 3-3 is a block diagram of another two-dimensional barcode detection apparatus according to an embodiment;

FIG. 3-4 is a block diagram of another two-dimensional barcode detection apparatus according to an embodiment;

FIG. 3-5 is a block diagram of another two-dimensional barcode detection apparatus according to an embodiment;

FIG. 3-6 is a block diagram of another two-dimensional barcode detection apparatus according to an embodiment;

FIG. 3-7 is a block diagram of another two-dimensional barcode detection apparatus according to an embodiment; and FIG. 4 is a schematic structural diagram of a terminal according to an embodiment.

The foregoing accompanying drawings have shown embodiments, and the following provides more details. These accompanying drawings and text descriptions do not intend to limit the scope of the idea in any way, and instead, describe concepts for a person skilled in the art with reference to particular embodiments.

DETAILED DESCRIPTION

To make the objectives, technical solutions, and advantages clearer, the following further describes implementations in detail with reference to the accompanying drawings.

To describe the technical solutions of the embodiments more clearly, the following briefly introduces the accompanying drawings required for describing the embodiments. Apparently, the accompanying drawings in the following description show only some embodiments, and a person of ordinary skill in the art may still derive other accompanying drawings from these accompanying drawings without creative efforts.

Figure 1:
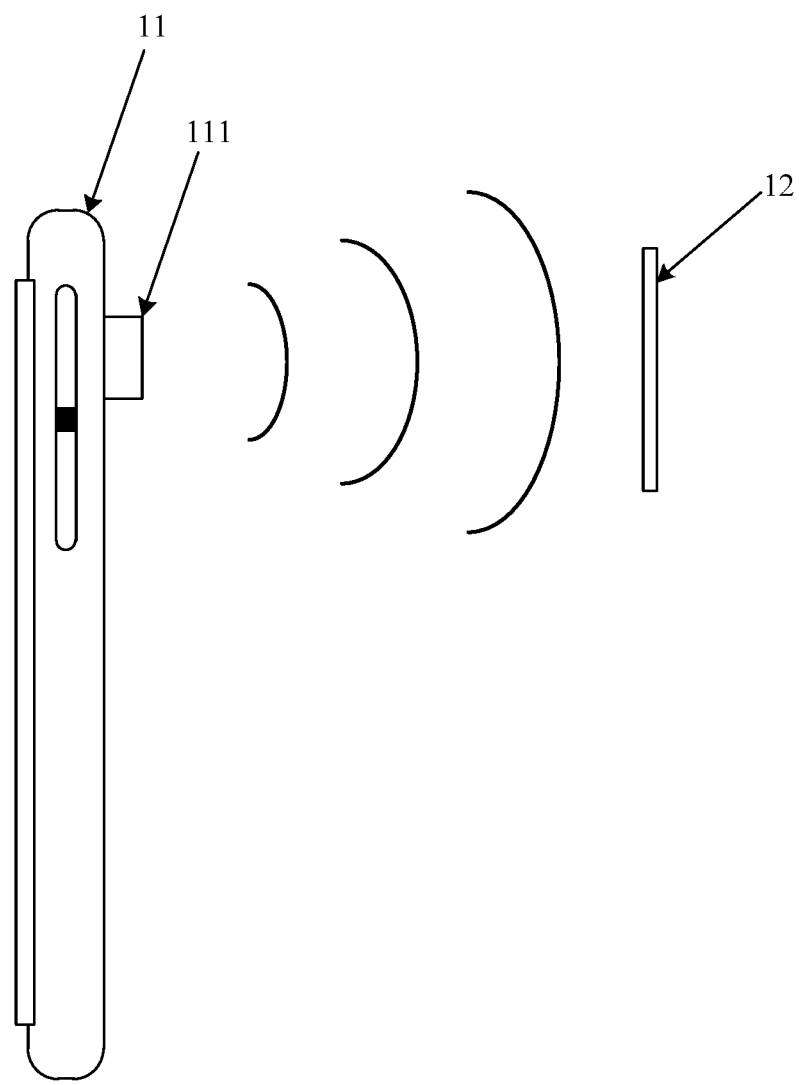
FIG. 1 is a schematic diagram of an implementation environment according to one or more exemplary embodiments.

FIG. 1 is a schematic diagram of an implementation environment according to one or more exemplary embodiments. The implementation environment may include a terminal 11 and a two-dimensional barcode 12. The terminal 11 may detect the two-dimensional barcode 12 in multiple manners.

The terminal 11 may include one or a plurality of types of terminals having a photographing function, for example, a mobile phone, a tablet computer, smart glasses, and a smartwatch. The terminal 11 may include a camera 111 configured to obtain an image.

The two-dimensional barcode 12 may include a two-dimensional barcode printed on surfaces of various objects, or may include a two-dimensional barcode displayed on a display. The two-dimensional barcode may be a quick response (QR) code, a Data Matrix code, a vericode, or the like.

Figures 1, 2:
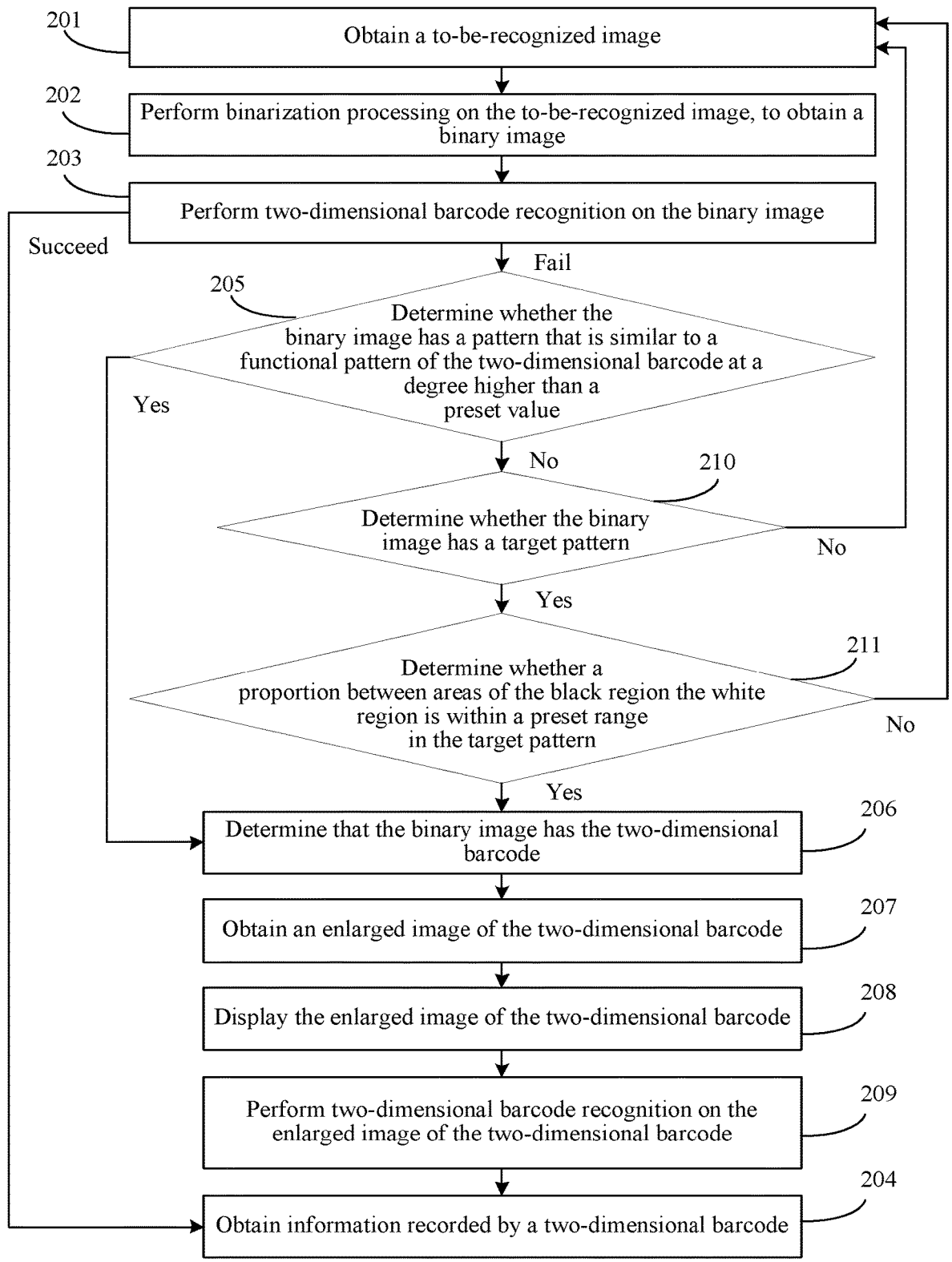
Figure 2:
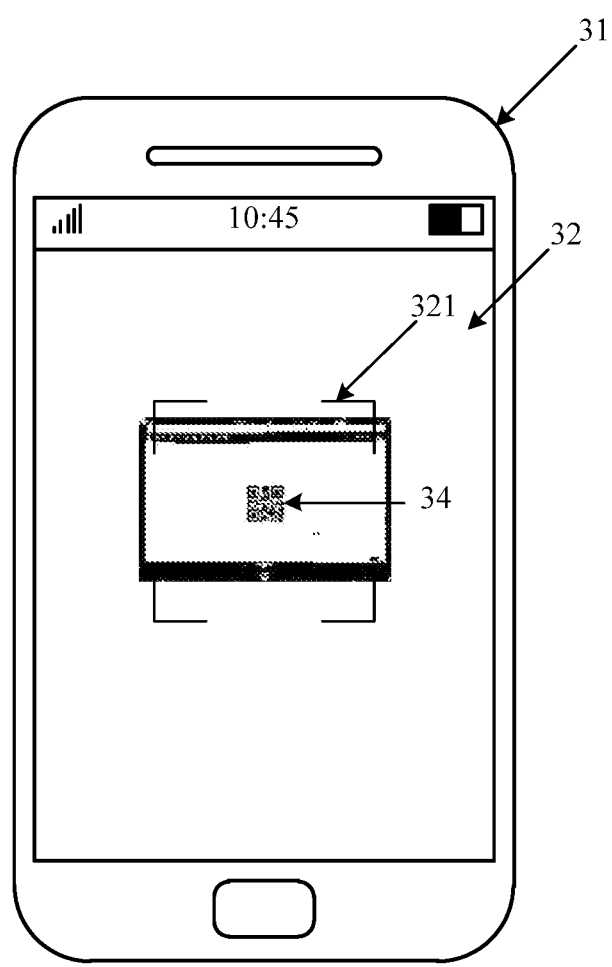

FIG. 2-1 is a flowchart of a two-dimensional barcode detection method according to an embodiment. This embodiment uses an example in which the method is applied to the terminal in the implementation environment shown in FIG. 1. The two-dimensional barcode detection method may include steps S201-S211.

Step 201. Obtain a to-be-recognized image.

When the two-dimensional barcode detection method provided in this embodiment is used, the terminal may obtain the to-be-recognized image (or an image upon which a two-dimensional barcode detection is to be performed) by using a camera.

Optionally, the method provided in this embodiment may start in response to triggering by a two-dimensional barcode detection instruction. That is, the terminal may obtain the to-be-recognized image when receiving the two-dimensional barcode detection instruction. The two-dimensional barcode detection instruction may be sent by a user, and may be sent in a manner of clicking a two-dimensional barcode detection key (including a virtual key and/or a physical key), and the two-dimensional barcode detection key may include a scanning key of various applications.

When receiving the two-dimensional barcode detection instruction, the terminal may enter a two-dimensional barcode detection interface, and continuously obtain images by using a camera. For example, the terminal may obtain images by using a scanning function of the camera. The images continuously obtained may be displayed on the two-dimensional barcode detection interface. In this case, a user may operate the camera of the terminal to focus on the two-dimensional barcode. The to-be-recognized image may be any frame image of images obtained by the camera, or may be a thumbnail of any frame image obtained by the camera. For example, the thumbnail may have a reduced resolution of the frame image obtained by the camera. When the to-be-recognized image is the thumbnail, a detection speed of the terminal can be increased, frame freezing is alleviated, and user experience is improved.

FIG. 2-2 is a schematic diagram of obtaining an image on a two-dimensional barcode scanning interface 32 by a terminal 31. When the terminal 31 displays the two-dimensional barcode scanning interface 32, a user may focus a camera of the terminal 31 on a two-dimensional barcode 34, so that the two-dimensional barcode 34 is located in a scanning box 321 in the middle of the two-dimensional barcode scanning interface 32. FIG. 2-2 shows a case in which the image obtained by the terminal has the two-dimensional barcode. Alternatively, the image obtained by the terminal may not have the two-dimensional barcode.

Referring back to FIG. 2-1, step 202: Perform binarization processing on the to-be-recognized image, to obtain a binary image.

The terminal may perform binarization processing on the to-be-recognized image obtained by the camera, to obtain the binary image of the to-be-recognized image. The obtained binary image may be, for example, illustratively shown in FIG. 2-3, and may have the two-dimensional barcode.

Binarization processing is a processing in which a grayscale value of each pixel in an image is set to A or B (A and B may have grayscale values that are greatly different from each other in order to facilitate distinguishing). Based on binarization processing, the image includes only two types of pixels having greatly different grayscale values. The binarization processing can reduce interference of various elements in the image to image analysis. In an exemplary embodiment, when binarization processing is performed, it may be determined whether a grayscale value of each pixel in the binary image is greater than a threshold. The threshold may be determined in a manner that is known in the art, for example, with reference to a manner of determining a threshold in a method of local adaptive binarization. When a grayscale value of a pixel is greater than or equal to the threshold, the pixel is set to white (e.g., set to have a grayscale value of white being 255 in 256 grey levels). When a grayscale value of a pixel is less than the threshold, the pixel is set to black (e.g., set to have a grayscale value of black being 0 in 256 grey levels), until all pixels in the image are processed.

In the related art, there may be multiple binarization processing methods, for example, a global thresholding method, a local thresholding method, a maximum between-cluster variance method, and an iterative thresholding method. In this embodiment, binarization processing may be performed with reference to one or more of the binarization processing methods.

In addition, in this embodiment, it may be considered that in the binary image, a pixel having a small grayscale value is a black pixel, and a pixel having a large grayscale value is a white pixel.

Referring back to FIG. 2-1, step 203: Perform two-dimensional barcode detection on the binary image. When detection succeeds, step 204 is performed; and when detection fails, step 205 is performed.

The terminal may first perform the two-dimensional barcode detection on the binary image by using a traditional two-dimensional barcode detection method. If detection succeeds, it indicates that the two-dimensional barcode is near the terminal. In this case, the two-dimensional barcode may not be detected by using the detection method provided in this embodiment. If detection fails, it indicates that the two-dimensional barcode may be excessively far from the terminal, or the two-dimensional barcode does not exist in a direction currently pointed to by the camera. In this case, the two-dimensional barcode may be detected by using the detection method provided in this embodiment.

In this embodiment, a QR code is used as an example to describe a structure of a two-dimensional barcode.

Figures 2, 3:
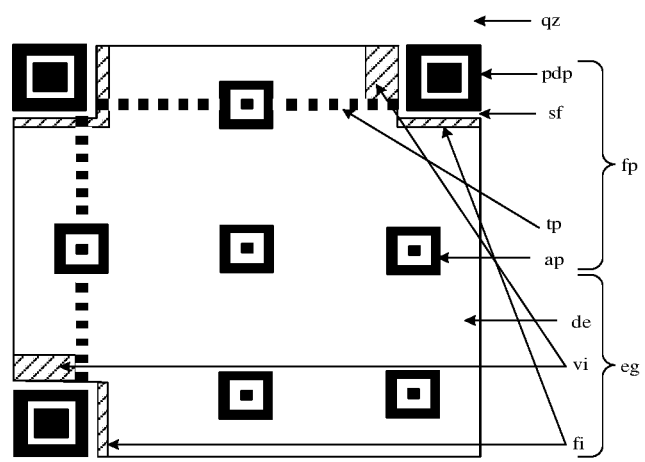
Figures 2, 3, 4:
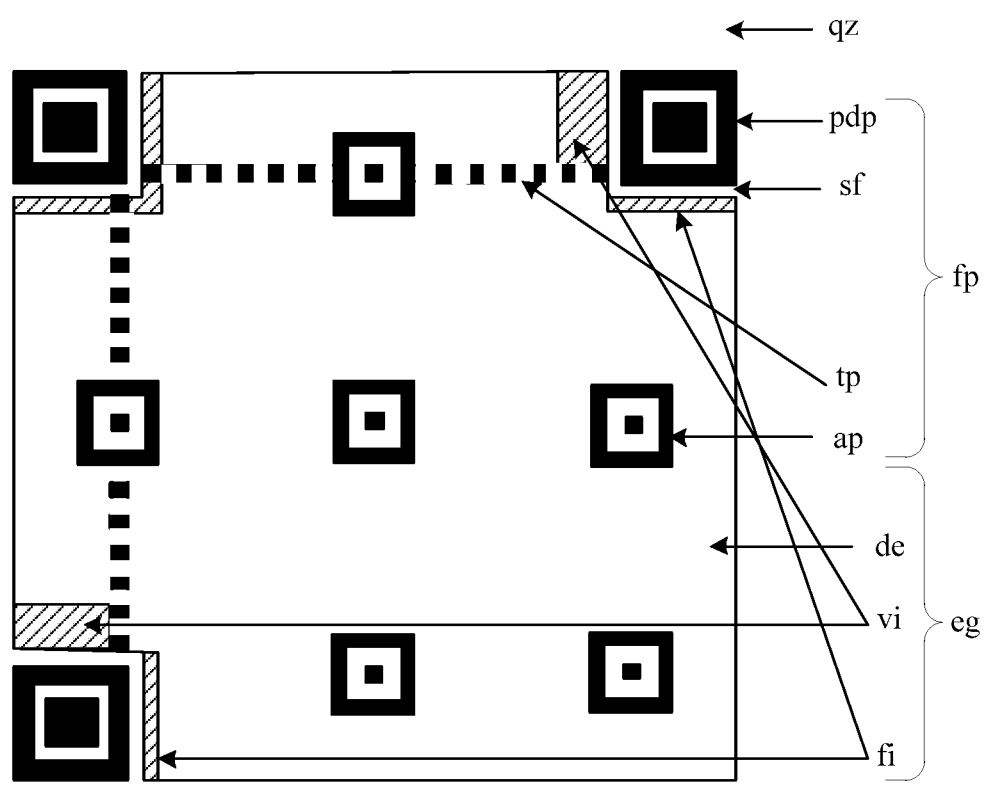

FIG. 2-4 is a schematic structural diagram of a QR code. The QR code may be a square, and the QR code includes a functional pattern fp and an encoding region eg. The functional pattern fp may include a position detection pattern pdp, an amendment pattern ap, and for QR codes of different versions, positions and quantities of amendment patterns may be different. The functional pattern fp may further include separators sf for the position detection pattern pdp, and timing patterns tp. The encoding region eg may include format information fi, vision information vi, and a data and error correction codeword de.

Minimum elements (e.g., a black block and a white block) in the QR code are referred to as modules, and the modules may record information in the encoding region eg. The position detection pattern pdp is provided at three corners of the QR code. The terminal may determine a position of the QR code by using the position detection pattern pdp. The amendment pattern ap is used to further correct the position of the QR code. Because of a position of the camera, in the image that is obtained by the camera and that includes the QR code, the QR code may deform, and the terminal may perform perspective transformation on the QR code according to the position detection pattern pdp and the amendment pattern, so that the QR code changes to an original shape.

The timing pattern tp is used to determine coordinates of a module. The format information fi records an error-correcting rate and a mask pattern of the two-dimensional barcode. The version information vi is used to record version information of the two-dimensional barcode. The data and error correction codeword de is used to record data and an error-correcting code of data. The periphery of the QR code may further have a circle of quiet zone qz. The quiet zone qz is used to avoid that detection of the two-dimensional barcode is interfered because patterns surrounding the two-dimensional barcode is in contact with the two-dimensional barcode.

Referring back to FIG. 2-1, step 204: Obtain information recorded by a two-dimensional barcode.

When successfully detecting the two-dimensional barcode, the terminal may obtain the information recorded by the two-dimensional barcode. The information recorded by the two-dimensional barcode may include a character string formed by at least one type of character, and the at least one type of character may be, for example, digits, texts (for example, Chinese characters and various foreign language characters), signs, and the like.

Step 205: Determine whether the binary image has a pattern that is similar to a functional pattern of the two-dimensional barcode at a degree equal to or higher than a preset value. When the binary image has the pattern that is similar to the functional pattern of the two-dimensional barcode at the degree equal to or higher than the preset value, step 206 is performed. When the binary image does not have the pattern that is similar to the functional pattern of the two-dimensional barcode at the degree equal to or higher than the preset value, step 210 is performed.

When the terminal performs the two-dimensional barcode detection on the binary image, and the detection fails, it may be determined whether the binary image has the pattern that is similar to the functional pattern of the two-dimensional barcode at the degree equal to or higher than the preset value. The two-dimensional barcode detection may fail because the binary image does not have the two-dimensional barcode, or the binary image has the two-dimensional barcode but the barcode detection is difficult. The barcode detection may be difficult when the two-dimensional barcode is far from the terminal, and as a result, an encoding region (or the functional pattern) of the two-dimensional barcode in the to-be-recognized image obtained by the terminal becomes seriously distorted.

In step 205, for the method of determining the similarity degree, various methods such as a scale invariant feature transform (SIFT) algorithm, a structural similarity (SIM) algorithm, and the like may be used. When the similarity degree is determined, a partial pattern of the functional pattern may be compared with the binary image. The functional pattern refers to a standard functional pattern that all of to-be-recognized two-dimensional barcodes of a particular type are expected to have, for example, the functional pattern shown in FIG. 2-4, and does not refer to the functional pattern in the binary image. Exemplarily, a pattern shown in FIG. 2-5 may be compared with a pattern in the binary image. The pattern in FIG. 2-5 may include a position detection pattern pdp, an amendment pattern ap, and a time pattern tp. Similarly, an entire pattern in the functional pattern may be alternatively compared with the binary image. This is merely exemplary and the disclosure is not limited in this embodiment.

In addition, because three position detection patterns of the QR code are arranged as an isosceles triangle, this feature may alternatively be used to determine whether the binary image has the pattern that is similar to the functional pattern of the two-dimensional barcode at the degree equal to or higher than the preset value. Exemplarily, the binary image may be searched for a position detection pattern. A found position detection pattern may essentially not be a position detection pattern, and may be incorrectly determined. A pattern formed by connection lines of three found position patterns is compared with an isosceles triangle. FIG. 2-6 is a schematic diagram of a triangle found from the binary image. The similarity degree between the triangle and an isosceles triangle may be determined to determine a possibility that the binary image has the two-dimensional barcode. That is, as the similarity degree between the triangle and an isosceles triangle is higher, the possibility that the binary image has the two-dimensional barcode is higher.

Based on the binary image having the pattern that is similar to the functional pattern of the two-dimensional barcode at the degree equal to or higher than the preset value, it may be determined that the binary image has the two-dimensional barcode, and the two-dimensional barcode is not excessively far from the terminal. Based on the binary image not having the pattern that is similar to the functional pattern of the two-dimensional barcode at the degree equal to or higher than the preset value, it may be determined that the two-dimensional barcode is far from the terminal, or the binary image does not have the two-dimensional barcode. In this case, step 210 in FIG. 2-1 may be performed to continue detection.

Referring back to FIG. 2-1, step 206: Determine that the binary image has the two-dimensional barcode.

Step 207: Obtain an enlarged image of the two-dimensional barcode.

When it is determined in step 206 that the binary image has the two-dimensional barcode, the terminal obtains the enlarged image of the two-dimensional barcode. The terminal may obtain the enlarged image in different manners when the terminal is in different running manners. For example, when the terminal has not stored an image that is displayed on the two-dimensional barcode detection interface by the terminal and obtained in each frame, the terminal may obtain the enlarged image of the two-dimensional barcode by focus adjustment. The focus adjustment may be digital zoom or optical zoom. However, when the terminal has stored an image obtained in each frame, the terminal may directly enlarge the to-be-recognized image corresponding to the binary image, to obtain the enlarged image of the two-dimensional barcode, where it is determined in step 206 that the binary image has the two-dimensional barcode. As discussed above, the binary image may be obtained by performing binarization processing on the to-be-recognized image corresponding to the binary image.

When obtaining the image by using the camera, the terminal obtains images of objects around the two-dimensional barcode. Therefore, the enlarged image of the two-dimensional barcode may be an enlarged image including the objects around the two-dimensional barcode, or an enlarged image of an image obtained by separately maintaining the image of the two-dimensional barcode. When obtaining the enlarged image of the two-dimensional barcode, the terminal may enlarge the two-dimensional barcode according to a proportion of the binary image that is occupied by a pattern determined as the two-dimensional barcode in the binary image. A proportion occupied by a display region of the two-dimensional barcode on the entire screen of the terminal may be preset, and then the two-dimensional barcode is enlarged to the proportion, to obtain the enlarged image of the two-dimensional barcode.

Additionally, because in the image obtained by the camera of the terminal, the two-dimensional barcode is usually located in the middle region of the image, the terminal may alternatively enlarge the middle region of the obtained image, to obtain the enlarged image of the two-dimensional barcode.

When step 207 is completed, the terminal may automatically obtain the enlarged image of the two-dimensional barcode when the two-dimensional barcode is away from the terminal by a particular distance, and a user does not need to operate the terminal to be near the two-dimensional barcode or perform manual focus adjustment to obtain the enlarged image of the two-dimensional barcode.

Step 208: Display the enlarged image of the two-dimensional barcode.

The terminal displays the enlarged image of the two-dimensional barcode on the display, so that the user can intuitively view an operation performed on the terminal, thereby improving user experience. FIG. 2-7 is a schematic diagram of displaying the enlarged image of the two-dimensional barcode 34 by the terminal 31. In FIG. 2-7, the same reference numerals as those in FIG. 2-2 are used to denote the same elements. Repetitive descriptions will be avoided. FIG. 2-7 shows the enlarged image including objects around the two-dimensional barcode 34. In this figure, the two-dimensional barcode 34 becomes larger compared with that in FIG. 2-2.

Typically, the terminal 31 may require a time interval to obtain the enlarged image of the two-dimensional barcode, and when the terminal 31 displays nothing during this period, it appears that frame freezing occurs on the terminal, and user experience is deteriorated. Therefore, in an exemplary embodiment, the terminal 31 may continuously obtain the enlarged image of the two-dimensional barcode 34 in step 207, and continuously display the enlarged image of the two-dimensional barcode 34 in step 208.

Referring back to FIG. 2-1, step 209: Perform two-dimensional barcode detection on the enlarged image of the two-dimensional barcode. When detection succeeds, step 204 is performed to obtain information recorded by a two-dimensional barcode.

The terminal may perform the two-dimensional barcode detection on the enlarged image of the two-dimensional barcode with reference to a known technology. Exemplarily, when recognizing the enlarged image of the two-dimensional barcode, the terminal may first perform processing such as binarization processing on the enlarged image of the two-dimensional barcode. For a manner of the binarization processing, refer to step 202, and details are not described herein again.

It should be noted that step 209 may also be performed before step 208, or may be simultaneously performed together with step 208. That is, after obtaining the enlarged image of the two-dimensional barcode, the terminal may first perform the two-dimensional barcode detection on the enlarged image of the two-dimensional barcode, and then display the enlarged image of the two-dimensional barcode, or perform the two-dimensional barcode detection on the enlarged image of the two-dimensional barcode while displaying the enlarged image of the two-dimensional barcode.

Additionally, after the terminal determines that the binary image has the two-dimensional barcode, the user may operate the camera of the terminal to turn to another direction that does not have the two-dimensional barcode, and it is difficult for the terminal to successfully perform the two-dimensional barcode detection. In this case, the terminal may continue to obtain and display the enlarged image, or display the image having a normal size again.

Step 210: Determine whether the binary image has a target pattern. When the target pattern does not exist, perform step 201; and when the target pattern exists, perform step 211, which will be described later.

When the binary image does not have the pattern that is similar to the functional pattern of the two-dimensional barcode at the degree equal to or higher than the preset value, the terminal may determine whether the binary image has the target pattern. The target pattern may be a pattern that has alternating black and white and that has a preset shape. The alternating black and white may refer to that the pattern includes both a black region and a white region provided at intervals. The preset shape may be a shape of a two-dimensional barcode of a target type, and the two-dimensional barcode of the target type is a type of two-dimensional barcode to be recognized by using the method provided in this embodiment. Different types of two-dimensional barcodes may have different preset shapes, for example, a shape of a QR code may be a square. Therefore, the pattern that has alternating black and white and that has the preset shape may refer to a pattern that includes the black region and the white region and whose shape is a shape of the two-dimensional barcode of the target type. As shown in FIG. 2-8, a process of determining whether the binary image has the target pattern may include the following two sub-steps:

Sub-step 2101: Determine whether the binary image has a pattern that has alternating black and white.

A procedure of determining, by the terminal, whether the binary image has the pattern that has alternating black and white may include operation 1), operation 2), and operation 3):

Operation 1) of separately performing expansion processing and corrosion processing on the binary image, to obtain an image by the expansion processing and obtain an image by the corrosion processing.

The terminal may first separately perform expansion processing and corrosion processing on the binary image, to obtain the image after the expansion processing and the image after the corrosion processing. Expansion processing may be understood as processing of changing eight pixels around each black pixel in the binary image to a black pixel. FIG. 2-9 shows an image obtained after performing expansion processing on the binary image shown in FIG. 2-3. In expansion processing, the two-dimensional barcode in the binary image may be processed to obtain a connected pattern (e.g., any two points of the connected pattern may be connected on a path).

Corrosion processing may be understood as processing of changing eight pixels around each white pixel in the binary image to a white pixel. FIG. 2-10 shows an image obtained after performing corrosion processing on the binary image shown in FIG. 2-3. Corrosion processing may be used to eliminate noise, and obtain independent image elements by division.

For algorithms of expansion processing and corrosion processing, refer to a known technology, and details are not described herein again.

Operation 2) of performing exclusive OR processing on the image after the expansion processing and the image after the corrosion processing.

After separately performing expansion processing and corrosion processing on the binary image, the terminal may perform exclusive OR processing on the image (e.g., referred to as p3 below for illustrative purposes) that is obtained after expansion processing and the image (e.g., referred to as p4 below for illustrative purposes) that is obtained after corrosion processing. Exclusive OR processing refers to determining a value of each pixel having same coordinates in p3 and p4. If pixels having same coordinates in p3 and p4 have a same color (e.g., both are white or black), the pixel is set to blank (that is, white) in the image obtained after exclusive OR processing. If pixels having same coordinates in p3 and p4 have different colors, the pixel is set to black in the image obtained after exclusive OR processing. FIG. 2-11 shows an image obtained after performing exclusive OR processing on FIG. 2-9 and FIG. 2-10.

Operation 3) of, when an image obtained after the exclusive OR processing includes a preset pattern, determining that the binary image has the pattern that has alternating black and white.

After obtaining the image (e.g., referred to as p5 below for illustrative purposes) by performing exclusive OR processing on p3 and p4, each pattern in p5 may be searched for (exemplarily, each pattern in p5 may be searched for by using a breadth first search (BFS) algorithm or another algorithm), and it is determined whether each pattern in p5 is the preset pattern. The preset pattern is a connected pattern, and in the connected pattern, an area that is occupied by a black region in a region surrounded by the boundary of the connected pattern is equal to or greater than a preset proportion. The preset proportion may be, for example but not limited to, 90%. This is because in the image obtained by performing exclusive OR processing on the image p3 and the image p4, patterns other than the two-dimensional barcode that has alternating black and white become hollow patterns including only boundaries, the area occupied by a black region is small in regions surrounded by the boundaries of these hollow patterns, and the two-dimensional barcode becomes a pattern having a large black region in p5 (as shown in FIG. 2-11). Therefore, based on the area that is occupied by a black region of each pattern in p5 and that is in a region surrounded by the boundary of the pattern, it may be determined whether the binary image has a pattern that has alternating black and white. That is, determination may be performed for each pattern in p5, to determine whether p5 has a pattern that has alternating black and white.

A determining process is as follows: determining whether the area that is occupied by a black region of a pattern is equal to or greater than the preset proportion of a region surrounded by the boundary of the pattern. When the area that is occupied by the black region is equal to or greater than the preset proportion of the region surrounded by the boundary of the pattern, the pattern is a pattern that has alternating black and white. When the area that is occupied by the black region is less than the preset proportion of the region surrounded by the boundary of the pattern, the pattern is not a pattern that has alternating black and white.

The preset pattern may be a pattern obtained after performing operations 1) and 2) on the pattern that has alternating black and white in the binary image. Because operations 1) and 2) do not change the shape of a pattern, when it is subsequently determined whether the pattern that has alternating black and white in the binary image has the preset shape, determining may be performed for the preset pattern. When the preset pattern has the preset shape, it is determined that the pattern that has alternating black and white in the binary image has the preset shape. When the preset pattern does not have the preset shape, it is determined that the pattern that has alternating black and white in the binary image does not have the preset shape.

When the terminal searches for each pattern in p5, various methods such as search pruning and intermediate variable preprocessing may be used to reduce a pattern searching time of the terminal and a time used by the terminal to perform the two-dimensional barcode detection.

Referring back to FIG. 2-8, sub-step 2102: When the binary image has the pattern that has alternating black and white, determine whether the preset pattern has the preset shape.

When the preset shape is a square (for example, a QR code, a data matrix, and a vericode are all squares), a procedure of determining whether any preset pattern has the preset shape may include operation 1), operation 2), operation 3), operation 4), and operation 5):

Operation 1) of establishing a rectangular coordinate system in a plane of a first pattern, where the first pattern is any preset pattern in the image obtained after the exclusive OR processing.

First, a rectangular coordinate system may be established in a plane of any preset pattern (e.g., the first pattern) of p5. Because the rectangular coordinate system is established in the plane of the first pattern, the rectangular coordinate system is a planar rectangular coordinate system.

Operation 2) of obtaining extreme coordinate points of the first pattern, where the extreme coordinate points include: a coordinate point having a maximum coordinate value and a coordinate point having a minimum coordinate value of the first pattern in the x-axis direction (e.g., the x-axis direction of the rectangular coordinate system established in the plane of the first pattern), and a coordinate point having a maximum coordinate value and a coordinate point having a minimum coordinate value of the first pattern in the y-axis direction (e.g., the y-axis direction of the rectangular coordinate system established in the plane of the first pattern).

The first pattern may have four extreme coordinate points, and may alternatively have more extreme coordinate points in some cases. Exemplarily, the first pattern has two coordinate points having maximum coordinate values in the y-axis direction. The two coordinate points have same coordinate values in the y-axis direction, and have different coordinate values in the x-axis direction. In some other cases, the extreme coordinate points of the first pattern may include overlapped points. Exemplarily, points having maximum coordinate values in the y-axis direction and points having minimum coordinate values of the first pattern in the x-axis direction may overlap, and the overlapped points may be used as two extreme coordinate points.

The boundary of the two-dimensional barcode in the image obtained by exclusive OR processing may include a rough point, and when the first pattern is the two-dimensional barcode, the rough point may be an extreme coordinate point.

Operation 3) of determining a target rectangle that surrounds the first pattern, whose four sides pass through the extreme coordinate points, and whose any of the sides is perpendicular to a coordinate axis.

When the target rectangle surrounding the first pattern is determined, one side of the target rectangle may be perpendicular to the x-axis of the rectangular coordinate system (in this way, other sides of the target rectangle are also perpendicular to the x-axis of rectangular coordinate system or parallel to the x-axis of the rectangular coordinate system), and four sides of the target rectangle may pass through all extreme coordinate points. As shown in FIG. 2-12, the x-axis is x, the y-axis is y, the target rectangle M surrounds outside the first pattern (not shown in FIG. 2-12), and extreme coordinate points are respectively d1, d2, d3, and d4.

Operation 4) of surrounding the first pattern with four scanning lines, where the four scanning lines are separately in contact with different points of the first pattern, and none of the four scanning lines is perpendicular or parallel to each side of the target rectangle.

After the target rectangle is determined, the first pattern is surrounded with four scanning lines, where the four scanning lines are separately in contact with different points of the first pattern, and none of the four scanning lines is perpendicular or parallel to each side of the target rectangle. Optionally, any scanning line may be determined in the following manner: a straight line starts from a position of an apex of the target rectangle, where an angle between the straight line and the x-axis is 45 degrees (e.g., a value of the angle may be within a preset range such as from 40 degrees to 50 degrees), moves towards a direction of the center of the target rectangle, and stops when being in contact with the first pattern. A straight line that stops is determined as a scanning line.

As shown in FIG. 2-13, the scanning lines s1, s2, s3, and s4 surround the first pattern, the scanning lines s1, s2, s3, and s4 are all in contact with the first pattern (not shown in FIG. 2-13), and none of the scanning lines s1, s2, s3, and s4 is perpendicular or parallel to each side of the target rectangle M. For details of other reference characters in FIG. 2-13, refer to FIG. 2-12, and details are not described herein again.

Operation 5) of using contact points of the four scanning lines and the first pattern as vertexes of the first pattern, and determining whether the first pattern is a square.

After contact points of the four scanning lines and the first pattern are determined, because the contact points are not rough points of the first pattern, the contact points may be determined as apexes of the first pattern. The terminal may determine, according to the apexes, whether the first pattern is a square, that is, determine whether a pattern formed by connecting the apexes is a square. For example, the terminal may determine whether connection lines of the apexes can form a square, and if connection lines of the apexes can form a square, it is determined that the first pattern is a square, or if none of the connection lines of the apexes can form a square, it is determined that the first pattern is not a square. When the first pattern is a square, it may be determined that the binary image has a pattern that has alternating black and white and that has the preset shape. When the first pattern is not a square, it may be determined that the binary image does not have a pattern that has alternating black and white and that has the preset shape.

Operations 1) to 5) in step 210 are used to determine an apex of the first pattern, to avoid that when the first pattern is the two-dimensional barcode, a rough point in the first pattern is incorrectly determined as an apex, and to improve a correction rate of the two-dimensional barcode detection. Additionally, in step 210, a traditional shape determining method may also be used to determine whether a pattern that has alternating black and white has the preset shape. This is merely exemplary and the disclosure is not limited in this embodiment.

In another implementation of step 210, as shown in FIG. 2-14, step 210 may include the following two sub-steps:

Sub-step 2103: Remove a pattern that is in contact with the boundary of the preset range in the binary image.

With reference to descriptions in step 201, when the terminal determines whether the binary image has the two-dimensional barcode, because the user focus the camera on the two-dimensional barcode in advance, it is highly possible that the two-dimensional barcode is within the preset range using the center of the binary image as a center point. Therefore, determining may be performed within the preset range of the binary image, to reduce computing amount of the terminal, and a time used by the terminal to perform the two-dimensional barcode detection. Before determining is performed within the preset range, the pattern that is in contact with the boundary of the preset range in the binary image may be removed in step 2103, to avoid that an incomplete pattern divided by the boundary of the preset range interferes the determining process. The preset range may be a region including the center of the binary image, and the region may be a square, a rectangle, a circle, or the like using the center of the binary image as a center. It should be noted that, the pattern that is in contact with the boundary of the preset range may include a pattern that is within the preset range and that does not overlap with the boundary of the preset range, a pattern that is outside the preset range and that does not overlap with the boundary of the preset range, and a pattern overlapping with the preset range.

As shown in FIG. 2-15, the preset range 33 has a part of a pattern p2 and a pattern p1. The pattern p2 is in contact with the boundary of the preset range 33, and is divided by the boundary of the preset range 33. The part of the pattern p2 within the preset range 33 is a square, and is not an actual shape of the pattern p2. Therefore, the pattern p2 may be removed to avoid that the part of the pattern p2 within the preset range 33 is incorrectly determined as the two-dimensional barcode. For details of other reference characters and reference numerals in FIG. 2-15, refer to FIG. 2-2, and details are not described herein again.

Sub-step 2104: Determine whether a pattern that has alternating black and white exists in a preset range of the binary image.

The terminal may determine whether a pattern that has alternating black and white exists within the preset range using the center of the binary image as a center point, to reduce a computing amount, and increase a two-dimensional barcode detection speed. For details of a determining process, refer to sub-step 2101 and sub-step 2102, and details are not described herein again.

Referring back to FIG. 2-1, step 211: Determine whether a proportion between areas of the black region the white region is within a preset range in the target pattern. When the proportion between the areas is not within the preset range, perform step 201; and when the proportion between the areas is within the preset range, perform step 206.

The proportion between the areas occupied by the white region and the black region is close to 1:1 in the two-dimensional barcode, and for some characters such as Chinese characters, the proportion between the areas occupied by the white region and the black region is far from 1:1 in the binary image. Therefore, it may be determined whether the proportion between the areas of the black region and the white region is within the preset range of, for example, [2/3, 3/2] (the preset range is a range whose proportion between areas is close to 1:1, but the preset range may also be another range, and the disclosure is not limited in this embodiment) in the target pattern, to avoid that characters such as Chinese characters are incorrectly determined as the two-dimensional barcode, and improve accuracy of the two-dimensional barcode detection method provided in this embodiment.

When the proportion between the areas is not within the preset range, it may indicate that the target pattern is not the two-dimensional barcode. In this case, the terminal may perform step 201, and continue to obtain the to-be-recognized image. Alternatively, the terminal may stop detecting a two-dimensional barcode, and prompt a user of a failure of the two-dimensional barcode detection. When the proportion between the areas is within the preset range, it may indicate that the target pattern is a two-dimensional barcode. In this case, step 206 may be performed.

The terminal can determine whether a position far from the terminal has a two-dimensional barcode by using step 210 and step 211.

In conclusion, in the two-dimensional barcode detection method provided in the embodiments, it is determined whether the binary image of the to-be-recognized image has the target pattern, and when the target pattern exists, it is determined that the binary image has the two-dimensional barcode, and two-dimensional barcode detection is performed on the enlarged image of the two-dimensional barcode. This solves the related-art problem that when a terminal is far from a two-dimensional barcode, it is difficult to obtain information in the two-dimensional barcode. When the terminal is far from the two-dimensional barcode, the two-dimensional barcode can still be detected according to exemplary embodiments.

Apparatus embodiments are described below, and may be used to perform the method embodiments described above. For details not described in the apparatus embodiments, refer to the method embodiments described with reference to FIG. 1-FIG. 2-15.

FIG. 3-1 is a block diagram of a two-dimensional barcode detection apparatus according to an embodiment. The two-dimensional barcode detection apparatus may be implemented as a part or the entirety of a terminal by using software, hardware, or a combination thereof. The two-dimensional barcode detection apparatus may include:

an obtaining module 410, configured to: when receiving a two-dimensional barcode detection instruction, obtain a to-be-recognized image;

a binarization module 420, configured to perform binarization processing on the to-be-recognized image, to obtain a binary image;

a judging module 430, configured to determine whether the binary image has a target pattern;

a determining module 440, configured to: when the binary image has the target pattern, determine that the binary image has a two-dimensional barcode;

an enlarging module 450, configured to obtain an enlarged image of the two-dimensional barcode; and a detection module 460, configured to perform two-dimensional barcode detection on the enlarged image of the two-dimensional barcode.

Accordingly, in the two-dimensional barcode detection apparatus provided in the embodiments, it is determined whether the binary image of the to-be-recognized image has the target pattern, and when the target pattern exists, it is determined that the binary image has the two-dimensional barcode, and two-dimensional barcode detection is performed on the enlarged image of the two-dimensional barcode. This solves the related-art problem that when a terminal is far from a two-dimensional barcode, it is difficult to obtain information in the two-dimensional barcode. When the terminal is far from the two-dimensional barcode, the two-dimensional barcode can also be recognized.

Optionally, as shown in FIG. 3-2, the target pattern is a pattern that has alternating black and white and that has a preset shape, and the judging module 430 includes:

a black-white judging submodule 431, configured to determine whether the binary image has a pattern that has alternating black and white; and a shape judging submodule 432, configured to: when the binary image is determined to have the pattern that has alternating black and white, determine whether the pattern that has alternating black and white has the preset shape.

Optionally, the black-white judging submodule 431 is configured to:

separately perform expansion processing and corrosion processing on the binary image, to obtain an image based on a result of the expansion processing and an image based on a result of the corrosion processing;

perform exclusive OR processing on the image obtained based on a result of the expansion processing and the image obtained based on a result of the corrosion processing; and when an image obtained after the exclusive OR processing includes a preset pattern, determine that the binary image has the pattern that has alternating black and white, where the preset pattern is a connected pattern, and in the connected pattern, an area that is occupied by a black region in a region surrounded by the boundary of the connected pattern is greater than a preset proportion.

Optionally, the preset shape is a square, and the shape judging submodule 432 is configured to:

establish a rectangular coordinate system in a plane of a first pattern, where the first pattern is any preset pattern in the image obtained by the exclusive OR processing;

obtain extreme coordinate points of the first pattern, where the extreme coordinate points include: a coordinate point having a maximum coordinate value and a coordinate point having a minimum coordinate value of the first pattern in the x-axis direction of the rectangular coordinate system, and a coordinate point having a maximum coordinate value and a coordinate point having a minimum coordinate value of the first pattern in the y-axis direction of the rectangular coordinate system;

determine a target rectangle that surrounds the first pattern, whose four sides pass through the extreme coordinate points, and whose any side is perpendicular to a coordinate axis of the rectangular coordinate system;

surround the first pattern with four scanning lines, where the four scanning lines are separately in contact with different points of the first pattern, and none of the four scanning lines is perpendicular or parallel to each side of the target rectangle; and use contact points of the four scanning lines and the first pattern as vertexes of the first pattern, and determine whether the first pattern is a square.

Optionally, as shown in FIG. 3-3, the two-dimensional barcode detection apparatus further includes:

a two-dimensional barcode detection module 471, configured to perform the two-dimensional barcode detection on the binary image; and a first execution module 472, configured to when detection fails, perform the step of determining whether the binary image has the target pattern.

Optionally, as shown in FIG. 3-4, the two-dimensional barcode detection apparatus further includes:

a similarity degree determining module 481, configured to determine whether the binary image has a pattern that is similar to a functional pattern of the two-dimensional barcode at a degree equal to or higher than a preset value; and a second execution module 482, configured to: when the binary image does not have the pattern that is similar to the functional pattern of the two-dimensional barcode at the degree equal to or higher than the preset value, perform the step of determining whether the binary image has the target pattern.

Figures 2, 3, 4, 5:
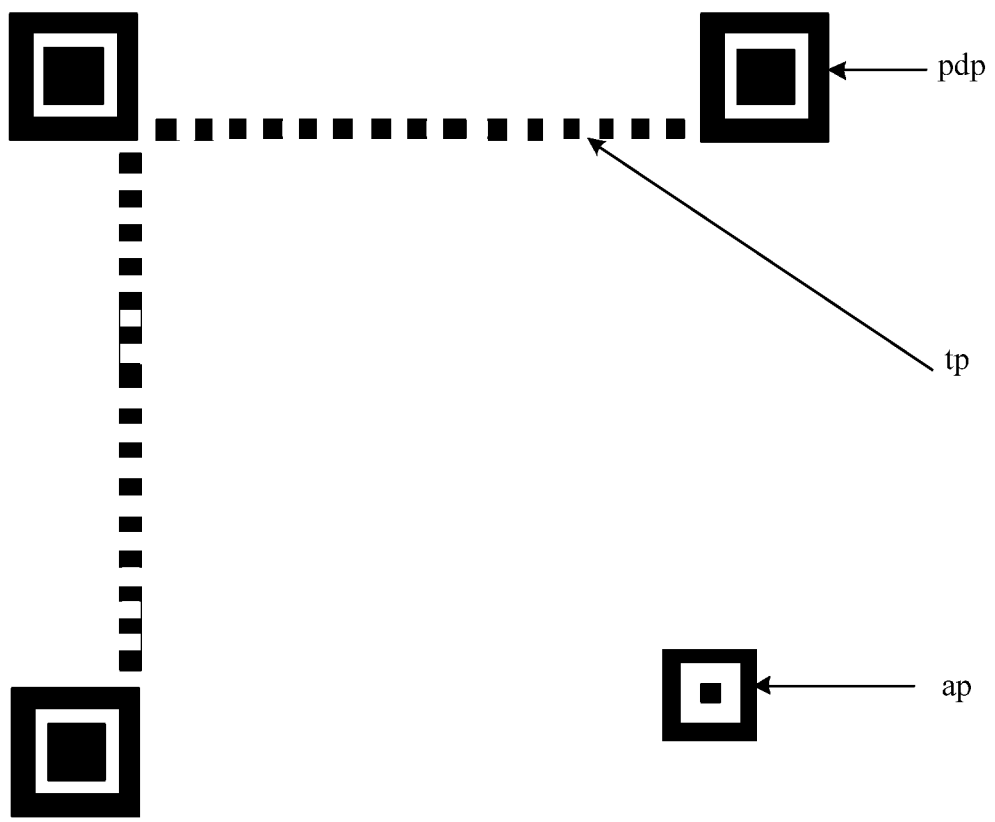
Figures 2, 3, 4, 5, 6:
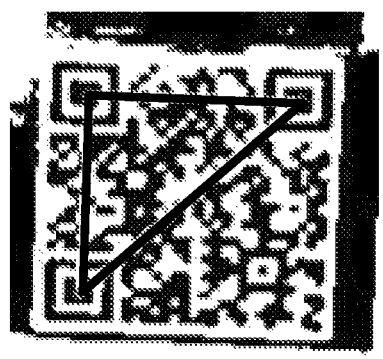
Figures 2, 3, 4, 5, 6, 7:
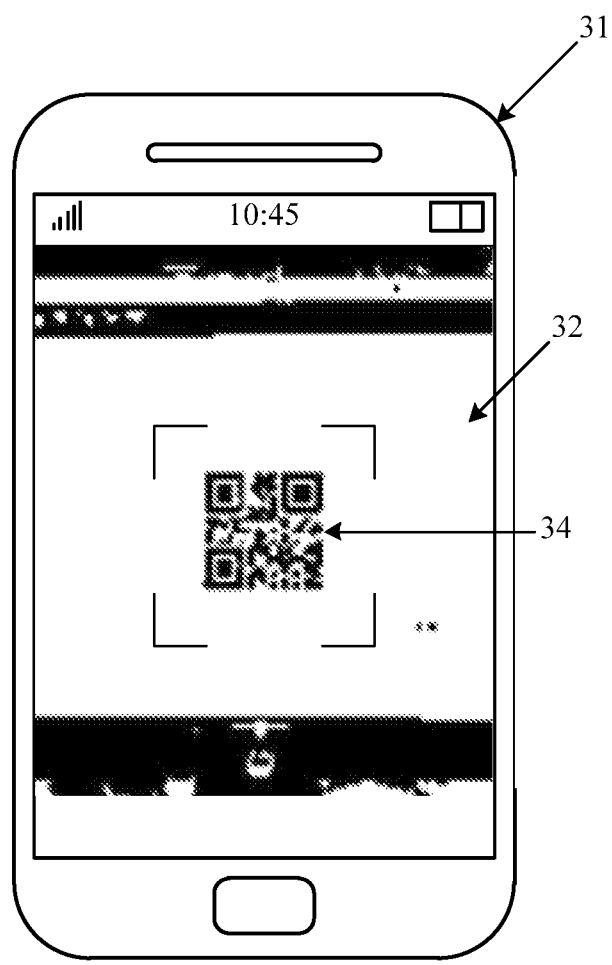
Figures 2, 3, 4, 5, 6, 7, 8:
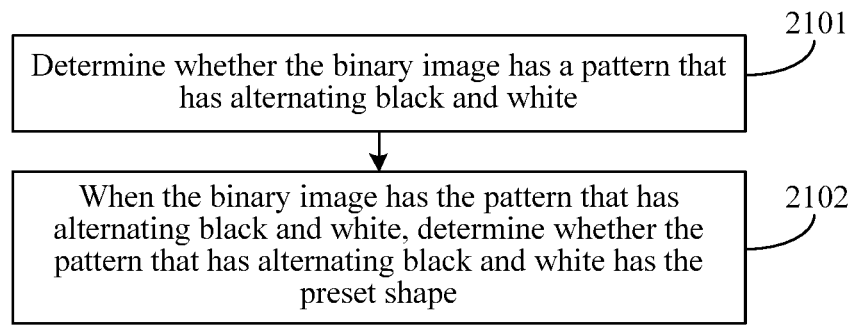
Figures 2, 3, 4, 5, 6, 7, 8, 9:
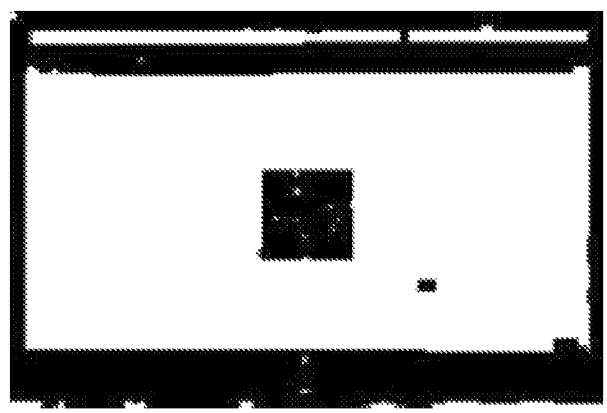
Figures 2, 3, 4, 5, 6, 7, 8, 9, 10:
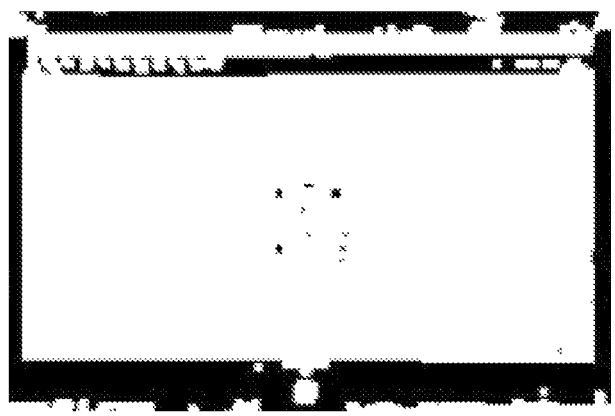
Figures 2, 3, 4, 5, 6, 7, 8, 9, 10, 11:
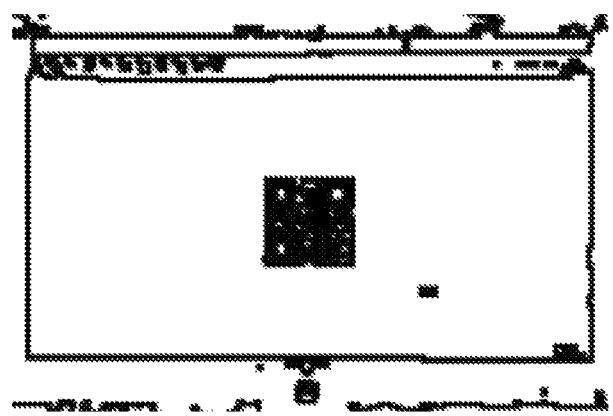
Figures 2, 3, 4, 5, 6, 7, 8, 9, 10, 11, 12:
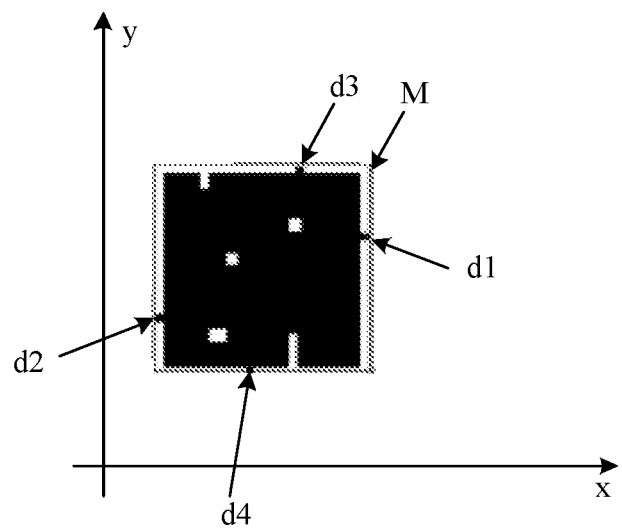
Figures 2, 3, 4, 5, 6, 7, 8, 9, 10, 11, 12, 13:
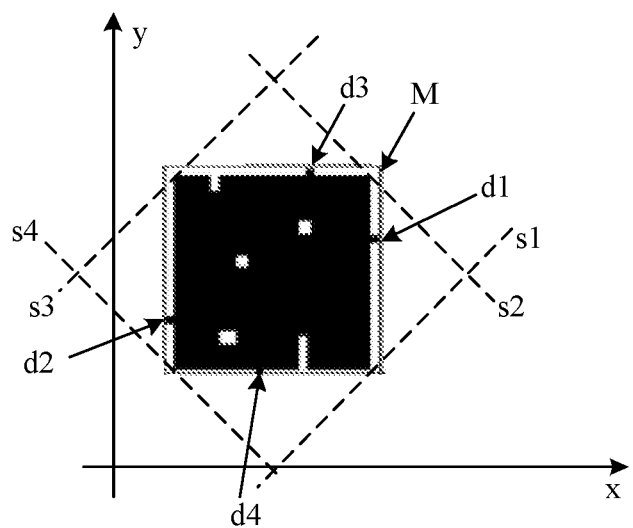
Figures 2, 3, 4, 5, 6, 7, 8, 9, 10, 11, 12, 13, 14:
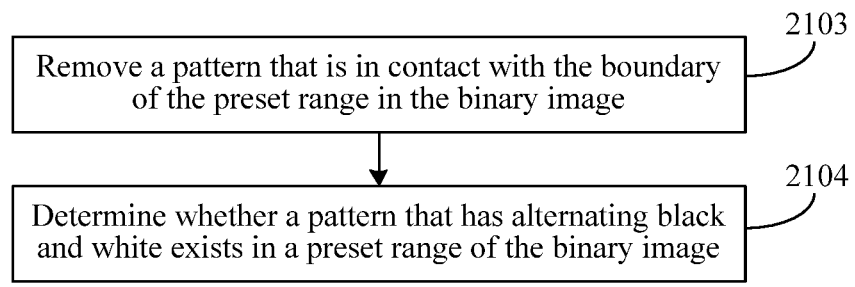
Figures 2, 3, 4, 5, 6, 7, 8, 9, 10, 11, 12, 13, 14, 15:
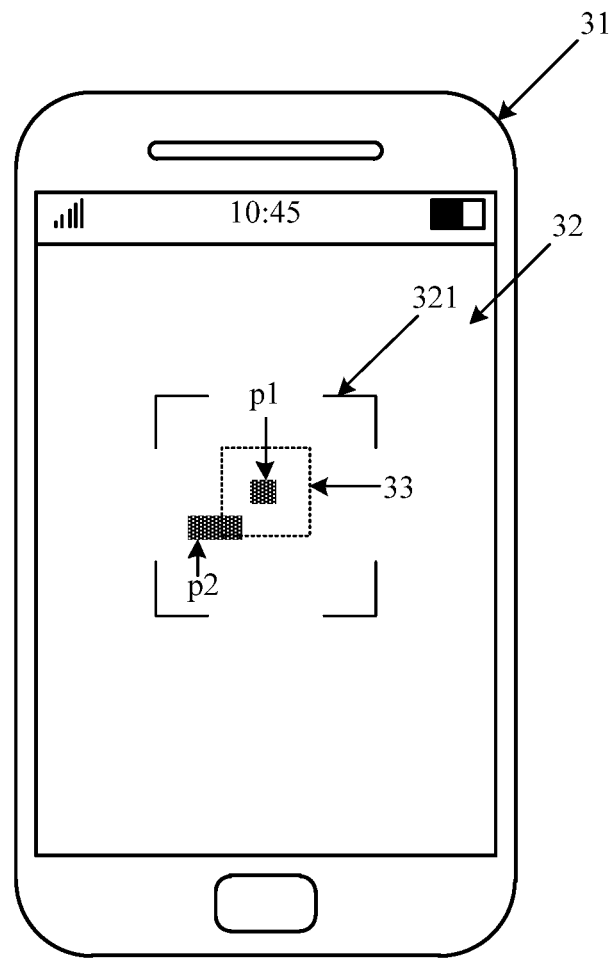
Figures 1, 3:
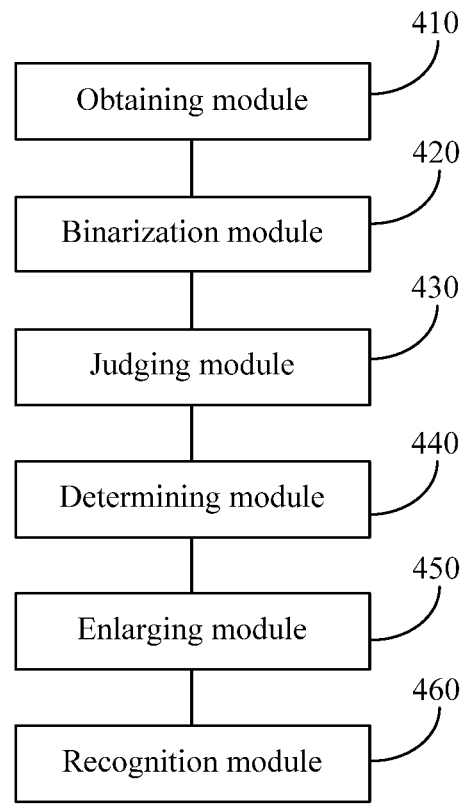
Figures 2, 3:
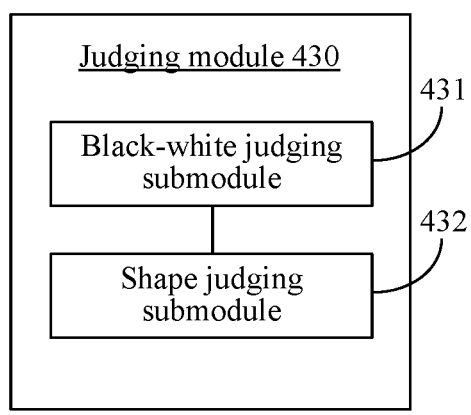
Figure 3:
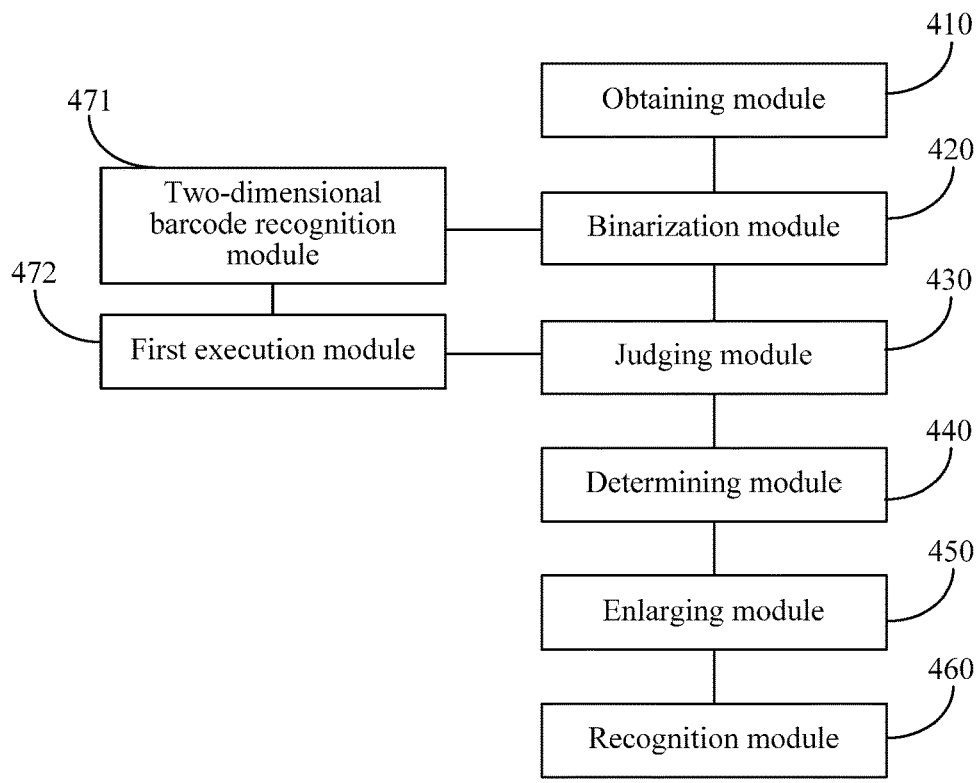
Figures 3, 4:
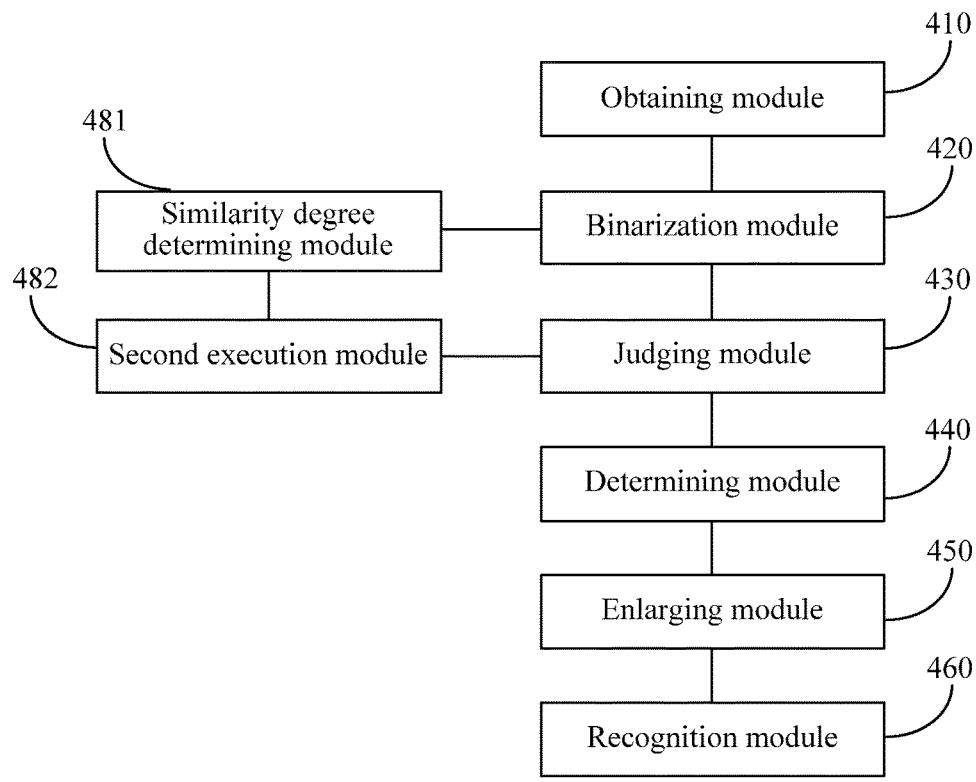
Figures 3, 4, 5:
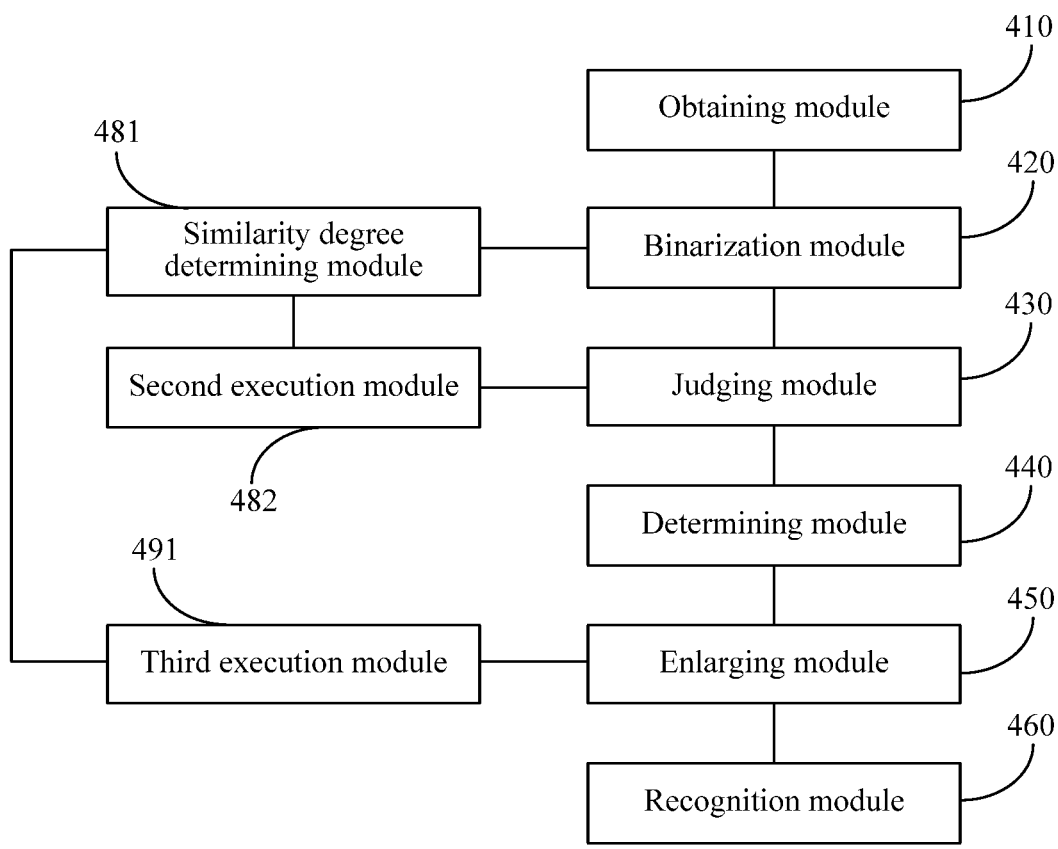
Figures 3, 4, 5, 6:
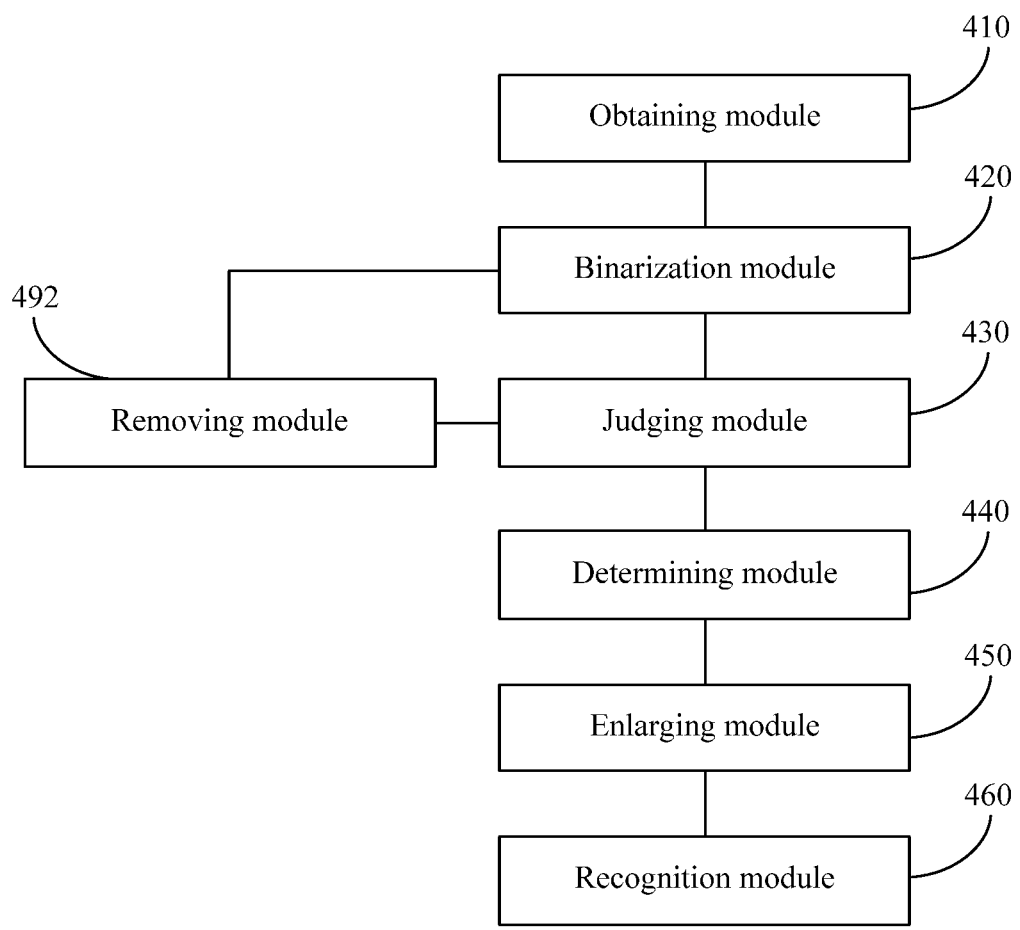
Figures 3, 4, 5, 6, 7:
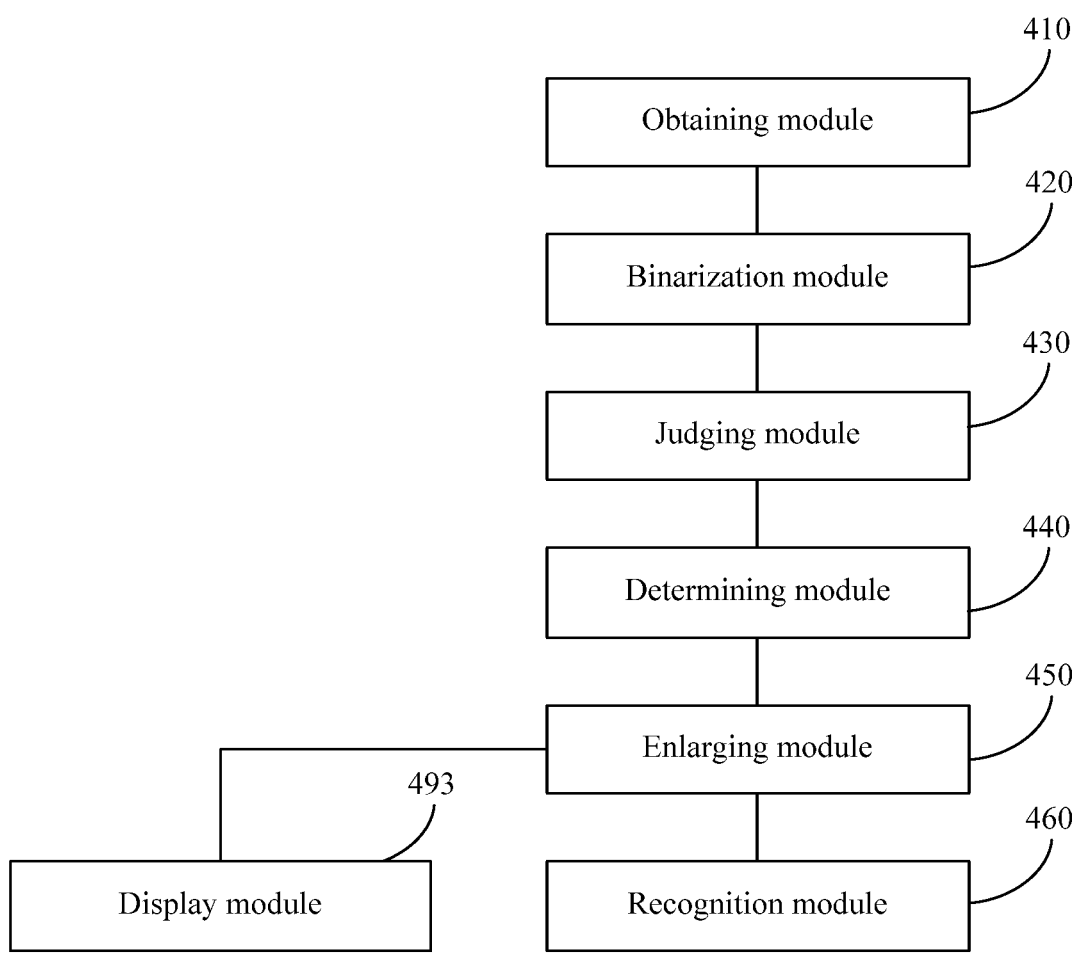
Figure 4:
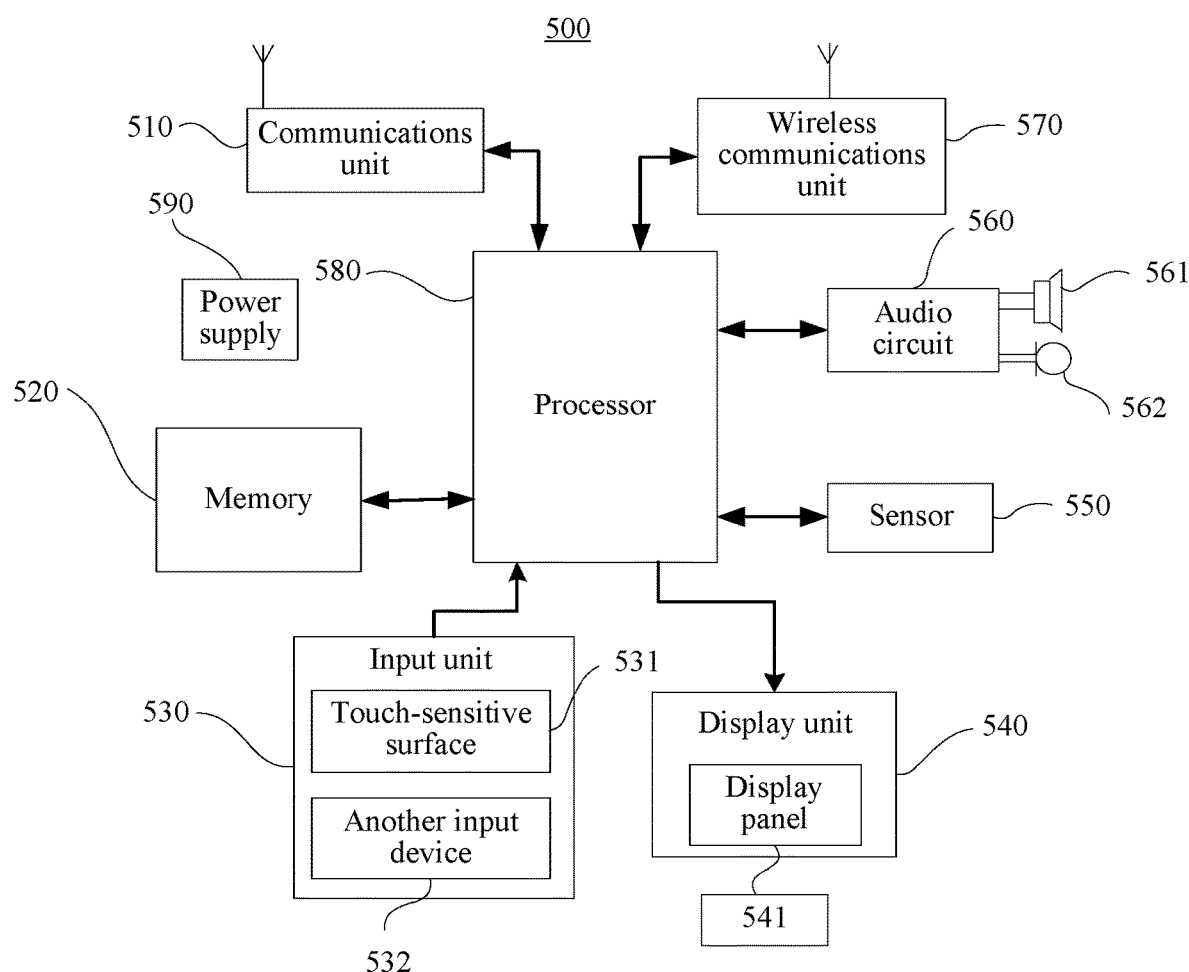

Optionally, as shown in FIG. 3-5, the two-dimensional barcode detection apparatus further includes:

a third execution module 491, configured to: when the binary image has the pattern that is similar to the functional pattern of the two-dimensional barcode at the degree equal to or higher than the preset value, perform the step of obtaining the enlarged image of the two-dimensional barcode.

Optionally, the judging module 430 is configured to:

determine whether the target pattern exists within a preset range that uses the center of the binary image as a center point.

Optionally, as shown in FIG. 3-6, the two-dimensional barcode detection apparatus further includes:

a removing module 492, configured to remove a pattern that is in contact with the boundary of the preset range in the binary image.

Optionally, the determining module 440 is configured to:

when the binary image has the target pattern, determine whether a proportion between areas of the black region the white region is within a preset range in the target pattern, where the preset range is [2/3, 3/2] for example; and when the proportion between the areas is within the preset range, determine whether the binary image has the two-dimensional barcode.

Optionally, as shown in FIG. 3-7, the two-dimensional barcode detection apparatus further includes:

a display module 493, configured to display the enlarged image of the two-dimensional barcode.

In conclusion, in the two-dimensional barcode detection apparatus provided in the embodiments, it is determined whether the binary image of the to-be-recognized image has the target pattern, and when the target pattern exists, it is determined that the binary image has the two-dimensional barcode, and two-dimensional barcode detection is performed on the enlarged image of the two-dimensional barcode. This solves the related-art problem that when a terminal is far from a two-dimensional barcode, it is difficult to obtain information in the two-dimensional barcode. When the terminal is far from the two-dimensional barcode, the two-dimensional barcode can also be recognized.

FIG. 4 is a schematic structural diagram of a terminal according to an embodiment. The two-dimensional barcode detection apparatus in the foregoing embodiment may be disposed in the terminal. Referring to FIG. 4, the terminal 500 may include components such as a communications unit 510, a memory 520 including one or more computer readable storage media, an input unit 530, a display unit 540, a sensor 550, an audio circuit 560, a wireless fidelity (WiFi) module 570, a processor 580 including one or more processing cores, and a power supply 590. A person skilled in the art may understand that the structure of the terminal shown in FIG. 4 does not limit the terminal, and may include more or fewer components than those shown in the figure, or some components may be combined, or a different component deployment may be used.

The communications unit 510 may be configured to receive and send signals in an information receiving and sending or call process, and the communications unit 510 may be a network communications device such as a radio frequency (RF) circuit, a router, and a modem. Particularly, when the communications unit 510 is the RF circuit, the communications unit 510 receives downlink information from a base station, then delivers the downlink information to one or more processors 580 for processing, and sends related uplink data to the base station. Generally, the RF circuit used as the communications unit 510 includes, but is not limited to, an antenna, at least one amplifier, a tuner, one or more oscillators, a subscriber identity module (SIM) card, a transceiver, a coupler, a low noise amplifier (LNA), and a duplexer.

In addition, the communications unit 510 may also communicate with a network and another device by wireless communication. The wireless communication may use any communications standard or protocol, which includes, but is not limited to, Global System for Mobile communications (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like.

The memory 520 may be configured to store a software program and module. The processor 580 runs the software program and module stored in the memory 520, to implement various functional applications and data processing. The memory 520 may mainly include a program storage region and a data storage region. The program storage region may store an operating system, an application program required by at least one function (such as a sound playback function and an image display function), and the like. The data storage region may store data (such as audio data and an address book) created according to use of the terminal 500, and the like. In addition, the memory 520 may include a high speed random access memory, and may also include a non-volatile memory, such as at least one magnetic disk storage device, a flash memory, or another volatile solid-state storage device. Correspondingly, the memory 520 may further include a memory controller, so as to provide access of the processor 580 and the input unit 530 to the memory 520.

The input unit 530 may be configured to receive input digit or character information, and generate a keyboard, mouse, joystick, optical, or track ball signal input related to the user setting and function control. For example, the input unit 530 may include a touch-sensitive surface 531 and another input device 532. The touch-sensitive surface 531, which may also be referred to as a touchscreen or a touch panel, may collect a touch operation of a user on or near the touch-sensitive surface (such as an operation of a user on or near the touch-sensitive surface 531 by using any suitable object or accessory, such as a finger or a stylus), and drive a corresponding connection apparatus according to a preset program.

Optionally, the touch-sensitive surface 531 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 580. Moreover, the touch controller can receive and execute a command sent from the processor 580. In addition, the touch-sensitive surface 531 may be a resistive, capacitive, infrared, or surface sound wave type touch-sensitive surface. In addition to the touch-sensitive surface 531, the input unit 530 may further include the another input device 532. The another input device 532 may include, for example but is not limited to, one or more of a physical keyboard, a functional key (such as a volume control key or a switch key), a track ball, a mouse, and a joystick.

The display unit 540 may be configured to display information input by the user or information provided for the user, and various graphical user interfaces of the terminal 500. The display unit 540 may include a display panel 541. Optionally, the display panel 541 may be configured by using a liquid crystal display (LCD), an organic light-emitting diode (OLED), or the like. Further, the touch-sensitive surface 531 may cover the display panel 541. After detecting a touch operation on or near the touch-sensitive surface 531, the touch-sensitive surface 131 transfers the touch operation to the processor 580, so as to determine the type of the touch event. Then, the processor 580 provides a corresponding visual output on the display panel 541 according to the type of the touch event. Although, in FIG. 4, the touch-sensitive surface 531 and the display panel 541 are used as two separate parts to implement input and output functions, in some embodiments, the touch-sensitive surface 531 and the display panel 541 may be integrated to implement the input and output functions.

The terminal 500 may further include at least one sensor 550, such as an optical sensor, a motion sensor, and other sensors. The optical sensor may include an ambient light sensor and a proximity sensor. The ambient light sensor may adjust luminance of the display panel 541 according to brightness of the ambient light. The proximity sensor may switch off the display panel 541 and/or backlight when the terminal 500 is moved to the ear. As one type of motion sensor, a gravity acceleration sensor can detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration detection (such as a pedometer and a knock), and the like. Other sensors, such as a gyroscope, a barometer, a hygrometer, a thermometer, and an infrared sensor, which may be configured in the terminal 500, are not further described herein.

The audio circuit 560, a loudspeaker 561, and a microphone 562 may provide audio interfaces between the user and the terminal 500. The audio circuit 560 may transmit, to the loudspeaker 561, an electric signal converted from received audio data. The loudspeaker 561 converts the electric signal into a sound signal for output. On the other hand, the microphone 562 converts a collected sound signal into an electric signal. The audio circuit 560 receives the electric signal and converts the electric signal into audio data, and outputs the audio data to the processor 580 for processing. Then, the processor 580 sends the audio data to, for example, another terminal by using the communications unit 510, or outputs the audio data to the memory 520 for further processing. The audio circuit 560 may further include an earplug jack, so as to provide communication between a peripheral earphone and the terminal 500.

To implement wireless communication, the terminal may be configured with a wireless communications unit 570, and the wireless communications unit 570 may be a WiFi module. The WiFi is based on a short distance wireless transmission technology. The terminal 500 may help, by using the wireless communications unit 570, the user to receive and send e-mails, browse a webpage, access streaming media, and so on, which provides wireless broadband Internet access for the user. Although the figure shows the wireless communications unit 570, it may be understood that the wireless communications unit is not a necessary component of the terminal 500, and when required, the wireless communications unit may be omitted as long as the scope of the essence of the present disclosure is not changed.

The processor 580 is a control center of the terminal 500, is connected to various parts of the entire mobile phone by using various interfaces and lines, and by running or executing a software program and/or module stored in the memory 520, performs various functions of the terminal 500 and processes data, so as to perform overall monitoring on the mobile phone. Optionally, the processor 580 may include one or more processor cores. The processor 580 may integrate an application processor and a modem processor. The application processor mainly processes an operating system, a user interface, an application program, and the like. The modem processor mainly processes wireless communication. It may be understood that the foregoing modem processor may also not be integrated into the processor 580.

The terminal 500 further includes the power supply 590 (such as a battery) for supplying power to the components. The power supply may be logically connected to the processor 580 by using a power management system, thereby implementing functions such as charging, discharging and power consumption management by using the power management system. The power supply 560 may further include one or more of a direct current or alternating current power supply, a re-charging system, a power failure detection circuit, a power supply converter or inverter, a power supply state indicator, and any other components.

Although not shown in the figure, the terminal 500 may further include a camera, a Bluetooth module, and the like, which are not further described herein.

In this embodiment, the terminal further includes one or more programs. The one or more programs are stored in the memory, and are configured to be executed by the one or more processors. The one or more programs are used to perform the two-dimensional barcode detection method provided in the embodiments.

In an exemplary embodiment, a non-transitory computer readable storage medium including an instruction is further provided, for example, a memory including an instruction, and the foregoing instruction may be executed by a processor of a terminal to complete the foregoing two-dimensional barcode detection method. For example, the non-transitory computer readable storage medium may be a ROM, a random access memory (RAM), a CD-ROM, a magnetic tape, a floppy disk, or an optical data storage device.

In the disclosure, a term "at least one of A and B" is only used to describe an association between associated objects, and indicates that there may be three relationships. For example, at least one of A and B may indicate three cases: only A exists, both A and B exist, and only B exists. Similarly, "at least one of A, B, and C" indicates that there may be seven relationships, and may indicate seven cases: only A exists, only B exists, only C exists, both A and B exist, both A and C exist, both C and B exist, and all A, B, and C exist. Similarly, "at least one of A, B, C, and D" indicates that there may be fifteen relationships, and may indicate fifteen cases: only A exists, only B exists, only C exists, only D exists, both A and B exist, both A and C exist, both A and D exist, both C and B exist, both D and B exist, both C and D exist, A, B, and C all exist, A, B, and D all exist, A, C, and D all exist, B, C, and D all exist, and A, B, C, and D all exist.

In the following description, a term 'module,' 'unit,' or 'part' refers to an element that performs at least one function or operation. The 'module' or 'unit' may be realized as hardware, software, or combinations thereof. A plurality of 'modules,' 'units,' or 'parts' may be integrated into at least one module or chip and realized as at least one processor (not shown), except for a case where respective 'modules' or 'units' need to be realized as discrete specific hardware.

In the several embodiments provided in the disclosure, it should be understood that the disclosed apparatus and method may be implemented in other manners. For example, the described apparatus embodiments are merely exemplary. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and the parts displayed as units may or may not be physical units, may be located in one position, or may be distributed on multiple network units. Some or all of the units may be selected according to actual needs to achieve the objectives of the solutions of the embodiments.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

At least one of the components, elements, modules or units described herein may be embodied as various numbers of hardware, software and/or firmware structures that execute respective functions described above, according to an exemplary embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in some of block diagrams, communication between the components, elements or units may be performed through the bus. Functional aspects of the above exemplary embodiments may be implemented in algorithms that execute on one or more processors. Furthermore, the components, elements or units represented by a block or processing operations may employ any number of related art techniques for electronics configuration, signal processing and/or control, data processing and the like.

The foregoing descriptions are merely embodiments, and are not intended to limit the disclosure. Any modification, equivalent replacement, or improvement made without departing from the spirit and principle of the disclosure should fall within the protection scope of the disclosure.

What is claimed is:

1. A method for detecting a two-dimensional barcode, by at least one processor of a terminal, the method comprising:

performing, by the at least one processor, binarization processing on an image to obtain a binary image;

in response to determining, by the at least one processor, that the binary image does not have a pattern that is similar to a functional pattern of a two-dimensional barcode at a degree equal to or higher than a preset value, determining whether the binary image has a target pattern;

determining, by the at least one processor, that the binary image has the two-dimensional barcode in response to determining that the binary image has the target pattern;

obtaining, by the at least one processor, an enlarged image of the two-dimensional barcode; and performing, by the at least one processor, two-dimensional barcode detection on the enlarged image of the two-dimensional barcode.

2. The method according to claim 1, wherein the determining whether the binary image has the target pattern comprises:

determining whether the binary image has a pattern having alternating black and white.

3. The method according to claim 2, wherein the determining whether the binary image has the pattern having alternating black and white comprises:

separately performing expansion processing and corrosion processing on the binary image, to obtain a first image based on a result of the expansion processing and obtain a second image based on a result of the corrosion processing;

performing exclusive OR processing on the first image and the second image, to obtain a third image; and in response to the third image comprising a preset pattern, determining that the binary image has the pattern having alternating black and white, wherein the preset pattern is a connected pattern, in which an area that is occupied by a black region is equal to or greater than a preset proportion of a region surrounded by a boundary of the connected pattern.

4. The method according to claim 3, wherein the determining whether the binary image has the target pattern further comprises determining whether the pattern having alternating black and white has a preset square shape by performing:

establishing a rectangular coordinate system in a plane of a first pattern, wherein the first pattern is among one or more preset patterns in the third image;

obtaining extreme coordinate points of the first pattern, the extreme coordinate points comprising a first coordinate point having a maximum coordinate value of the first pattern in an x-axis of the rectangular coordinate system, a second coordinate point having a minimum coordinate value of the first pattern in the x-axis of the rectangular coordinate system, a third coordinate point having a maximum coordinate value of the first pattern in a y-axis of the rectangular coordinate system, and a fourth coordinate point having a minimum coordinate value of the first pattern in the y-axis of the rectangular coordinate system;

determining a target rectangle that surrounds the first pattern, the target rectangle comprising four sides passing through the extreme coordinate points, and comprising at least one side that is perpendicular to a coordinate axis of the rectangular coordinate system;

surrounding the first pattern with four scanning lines, wherein the four scanning lines are separately in contact with different points of the first pattern, and none of the four scanning lines is perpendicular or parallel to each side of the target rectangle; and using contact points of the four scanning lines and the first pattern as vertexes of the first pattern, and determining whether the first pattern is a square.

5. The method according to claim 1, further comprising, after the performing binarization processing:

performing the two-dimensional barcode detection on the binary image; and in response to a failure of the two-dimensional barcode detection, performing the determining whether the binary image has the target pattern.

6. The method according to claim 1, further comprising:

in response to determining that the binary image has the pattern that is similar to the functional pattern of the two-dimensional barcode at the degree equal to or higher than the preset value, performing the obtaining of the enlarged image of the two-dimensional barcode without determining whether the binary image has the target pattern.

7. The method according to claim 1, wherein the determining whether the binary image has the target pattern comprises:

determining whether the target pattern exists within a preset range that uses a center of the binary image as a center point.

8. The method according to claim 7, further comprising, before the determining whether the target pattern exists within the preset range:

removing a pattern that is in contact with a boundary of the preset range in the binary image.

9. The method according to claim 1, wherein the determining that the binary image has the two-dimensional barcode comprises:

in response to determining that the binary image has the target pattern, determining whether a proportion between an area of a black region and an area of a white region is within a preset range in the target pattern, wherein the preset range is [2/3, 3/2]; and determining that the binary image has the two-dimensional barcode in response to determining that the proportion between the area of the black region and the area of the white region is within the preset range.

10. An apparatus for detecting a two-dimensional barcode, the apparatus comprising:

at least one memory operable to store program code; and at least one processor operable to read the program code and operate as instructed by the program code, the program code comprising:

binarization code configured to cause the at least one processor to perform binarization processing on an image to obtain a binary image;

first determination code configured to cause the at least one processor to perform expansion processing on the binary image to obtain a first image, perform corrosion processing on the binary image to obtain a second image, and determine whether the binary image has a target pattern based on the first image and the second image;

second determination code configured to cause the at least one processor to determine that the binary image has a two-dimensional barcode in response to determining that the binary image has the target pattern;

enlarging code configured to cause the at least one processor to obtain an enlarged image of the two-dimensional barcode; and detection code configured to cause the at least one processor to perform two-dimensional barcode detection on the enlarged image of the two-dimensional barcode.

11. The apparatus according to claim 10, wherein the first determination code causes the at least one processor to determine whether the target pattern has the target pattern by determining whether the binary image has a pattern having alternating black and white.

12. The apparatus according to claim 11, wherein the first determination code comprises:

code configured to cause the at least one processor to perform exclusive OR processing on the first image and the second image, to obtain a third image; and code configured to cause the at least one processor to, in response to the third image comprising a preset pattern, determine that the binary image has the pattern that has alternating black and white, wherein the preset pattern is a connected pattern, in which an area that is occupied by a black region is equal to or greater than a preset proportion of a region surrounded by a boundary of the connected pattern.

13. The apparatus according to claim 12, wherein the program code further comprises code configured to cause the at least one processor to determine whether the pattern having alternating black and white has a preset square shape by performing:

establishing a rectangular coordinate system in a plane of a first pattern, wherein the first pattern is among one or more preset patterns in the third image;

obtaining extreme coordinate points of the first pattern, the extreme coordinate points comprising a first coordinate point having a maximum coordinate value of the first pattern in an x-axis of the rectangular coordinate system, a second coordinate point having a minimum coordinate value of the first pattern in the x-axis of the rectangular coordinate system, a third coordinate point having a maximum coordinate value of the first pattern in a y-axis of the rectangular coordinate system, and a fourth coordinate point having a minimum coordinate value of the first pattern in the y-axis of the rectangular coordinate system;

determining a target rectangle that surrounds the first pattern, the target rectangle comprising four sides passing through the extreme coordinate points, and comprising at least one side that is perpendicular to a coordinate axis of the rectangular coordinate system;

surrounding the first pattern with four scanning lines, wherein the four scanning lines are separately in contact with different points of the first pattern, and none of the four scanning lines is perpendicular or parallel to each side of the target rectangle; and using contact points of the four scanning lines and the first pattern as vertexes of the first pattern, and determining whether the first pattern is a square.

14. The apparatus according to claim 11, wherein the program code further comprises:

code configured to cause the at least one processor to perform the two-dimensional barcode detection on the binary image; and code configured to cause the at least one processor to, in response to a failure of the two-dimensional barcode detection, determine whether the binary image has the target pattern.

15. The apparatus according to claim 11, wherein the program code further comprises:

code configured to cause the at least one processor to determine whether the binary image has a pattern that is similar to a functional pattern of the two-dimensional barcode at a degree equal to or higher than a preset value; and code configured to cause the at least one processor to, in response to determining that the binary image does not have the pattern that is similar to the functional pattern of the two-dimensional barcode at the degree equal to or higher than the preset value, determine whether the binary image has the target pattern.

16. The apparatus according to claim 15, wherein the program code further comprises:

code configured to cause the at least one processor to, in response to determining that the binary image has the pattern that is similar to the functional pattern of the two-dimensional barcode at the degree equal to or higher than the preset value, obtain the enlarged image of the two-dimensional barcode.

17. The apparatus according to claim 11, wherein the program code further comprises:

code configured to cause the at least one processor to determine whether the target pattern exists within a preset range that uses a center of the binary image as a center point.

18. The apparatus according to claim 17, wherein the program code further comprises:

code configured to cause the at least one processor to remove a pattern that is in contact with a boundary of the preset range in the binary image.

19. A non-transitory computer readable storage medium, which stores an instruction, the instruction, when executed by one or more processors, cause the one or more processors to perform:

performing binarization processing on an image to obtain a binary image;

determining whether the binary image has a target pattern;

determining that the binary image has a two-dimensional barcode in response to determining that the binary image has the target pattern and that a proportion between an area of a black region and an area of a white region in the target pattern is within a preset range, the preset range being [2/3, 3/2];

obtaining an enlarged image of the two-dimensional barcode; and performing two-dimensional barcode detection on the enlarged image of the two-dimensional barcode.

* * * * *